United States Patent
Uchibori

(10) Patent No.: US 9,199,605 B2
(45) Date of Patent: Dec. 1, 2015

(54) SEATBELT RETRACTOR AND SEATBELT APPARATUS HAVING THE SAME

(75) Inventor: Hayato Uchibori, Tokyo (JP)

(73) Assignee: Takata Corporation, Tokyo (JP)

( * ) Notice: Subject to any disclaimer, the term of this patent is extended or adjusted under 35 U.S.C. 154(b) by 233 days.

(21) Appl. No.: 13/816,900

(22) PCT Filed: Jul. 25, 2011

(86) PCT No.: PCT/JP2011/004165
§ 371 (c)(1),
(2), (4) Date: Feb. 13, 2013

(87) PCT Pub. No.: WO2012/039088
PCT Pub. Date: Mar. 29, 2012

(65) Prior Publication Data
US 2013/0140869 A1 Jun. 6, 2013

(30) Foreign Application Priority Data

Sep. 21, 2010 (JP) ................................. 2010-210695

(51) Int. Cl.
*B60R 22/41* (2006.01)
*B60R 22/38* (2006.01)
*B60R 22/34* (2006.01)

(52) U.S. Cl.
CPC ............... *B60R 22/41* (2013.01); *B60R 22/34* (2013.01); *B60R 22/38* (2013.01); *B60R 2022/3419* (2013.01)

(58) Field of Classification Search
CPC .......................... B60R 2022/3419; B60R 22/34
USPC .......... 242/383.1, 383.2, 382.2, 382.4, 382.1, 242/382, 383.4, 383; 280/805, 806, 807
See application file for complete search history.

(56) References Cited

U.S. PATENT DOCUMENTS

| | | | | |
|---|---|---|---|---|
| 6,152,393 | A * | 11/2000 | Ando et al. | 242/382.2 |
| 7,681,824 | B2 * | 3/2010 | Mori | 242/382.1 |
| 2004/0195422 | A1 * | 10/2004 | Fleischmann et al. | 242/382.2 |
| 2009/0057470 | A1 * | 3/2009 | Hiramatsu et al. | 242/396.1 |
| 2011/0127363 | A1 * | 6/2011 | Tatsuma et al. | 242/383.2 |

FOREIGN PATENT DOCUMENTS

| | | |
|---|---|---|
| JP | 09-058410 | 3/1997 |
| JP | 2004-262447 | 9/2004 |
| JP | 2006-082801 | 3/2006 |

(Continued)

OTHER PUBLICATIONS

International Search Report PCT/JP2011/004165 dated Aug. 30, 2011.

*Primary Examiner* — Sang Kim
*Assistant Examiner* — Juan Campos, Jr.
(74) *Attorney, Agent, or Firm* — Foley & Lardner LLP

(57) ABSTRACT

When an axis of rotation $9a_2$ of a spool rotates in the seatbelt retracting direction, a lock gear 13 rotates clockwise which is the same direction as the spool, and an eccentric gear 16 rotates counterclockwise. A cam 20 of the eccentric gear 16 comes into contact with a lever 36 of the control lever 35 to cause the control lever 35 to rotate counterclockwise to take an operating position. A pressed pin 42b of a lever 42 comes into contact with a lever 37, so that levers 42, 43 rotate counterclockwise. A holding portion 42c of the lever 42 opposes a flywheel 14. Accordingly, since the holding portion 42c presses a held portion 14d when the entire amount of a seatbelt 4 is retracted, a rocking movement of the flywheel 14 is prevented and hence end locking is prevented.

4 Claims, 14 Drawing Sheets

(56) References Cited

FOREIGN PATENT DOCUMENTS

| JP | 2007-083883 | 4/2007 |
| JP | 2008-081027 | 4/2008 |
| JP | 2008-213525 | 9/2008 |
| JP | 2009-061810 | 3/2009 |

* cited by examiner

SEATBELT RETRACTOR AND SEATBELT APPARATUS HAVING THE SAME

CROSS-REFERENCE TO RELATED PATENT APPLICATIONS

This application is the U.S. National Phase of International Application PCT/JP2011/004165, filed Jul. 25, 2011, which claims priority from Japanese Application Number 2010/210695, filed Sep. 21, 2010 including the specification, drawings, claims and abstract and is incorporated herein by reference in its entirety.

TECHNICAL FIELD

The present invention relates to a seatbelt retractor configured to prevent end locking caused by a rocking movement of a seatbelt withdrawal sensor configured to prevent a withdrawal of a seatbelt when the seatbelt is withdrawn abruptly from the normal state when the entire amount of the withdrawn seatbelt is retracted, and a seatbelt apparatus having the same.

BACKGROUND ART

In the related art, a seatbelt apparatus attached to a vehicle seat of a vehicle or the like prevents an occupant from jerking forward from the seat by constraining the occupant with a seatbelt in the case of an emergency such as a case where large deceleration is applied on the vehicle at the time of a collision or the like.

In general, such a seatbelt apparatus includes a seatbelt retractor. Examples of such a seatbelt retractor generally include an emergency locking seatbelt retractor (ELR) configured to prevent a withdrawal of the seatbelt by locking the rotation of a spool in a seatbelt withdrawing direction in the case of an emergency such as that described above and an automatic locking seatbelt retractor (ALR) having the function of the ELR and configured to prevent the withdrawal of the seatbelt by locking the rotation of the spool in the seatbelt withdrawing direction during the course of retraction of the seatbelt after the entire amount of the seatbelt has retracted until a predetermined amount of the seatbelt is retracted. The ALR includes an ELR-ALR switching mechanism configured to switch between the function of the ELR and the function of the ALR.

The seatbelt retractor in the related art is provided with a seatbelt withdrawal sensor (a so-called webbing sensor) configured to prevent the withdrawal of the seatbelt by the rocking movement when the seatbelt is abruptly withdrawn at a speed faster than a normal seatbelt withdrawing speed (that is, a withdrawing acceleration larger than a normal withdrawing acceleration when the seatbelt is fastened) in many cases. The seatbelt withdrawal sensor may prevent the withdrawal of the seatbelt through a rocking movement also when the entire amount of the withdrawn seatbelt is retracted. In other words, there is a case where normal withdrawal of the seatbelt becomes difficult due to the seatbelt withdrawal sensor making a rocking movement upon the entire amount of the seatbelt being retracted, that is, a so called end locking occurs.

Accordingly, there is proposed a seatbelt retractor that is capable of preventing end locking caused by a seatbelt withdrawal sensor (for example, see Patent Literature 1 and 2). The seatbelt retractor described in Patent Literatures 1 and 2 are provided with a cam plate configured to rotate in conjunction with a spool that winds a seatbelt, and the cam plate is provided with a helical long cam groove. The seatbelt retractor is provided with a rocking movement prevention member configured to prevent the rocking movement of the seatbelt withdrawal sensor provided so as to be rotatable while being controlled by the above-described cam groove.

Then, the cam plate rotates in the seatbelt withdrawing direction upon withdrawal of the seatbelt that has been retracted entirely, and the seatbelt is withdrawn by a predetermined amount, so that the rocking movement prevention member rotates toward a freely rocking position where the rocking movement prevention member allows the seatbelt withdrawal sensor to freely rock through control by the cam groove of the cam plate. Also, upon rotation of the cam plate in a seatbelt retracting direction caused by the retraction of the withdrawn seatbelt, the rocking movement prevention member rotates toward a rocking movement prevention position at which the rocking movement prevention member prevents the rocking movement of the seatbelt withdrawal sensor while being controlled by the cam groove. Then, when retracting the withdrawn seatbelt entirely, since the rocking movement prevention member is set to the rocking movement prevention position, the seatbelt withdrawal sensor cannot rock and hence end locking is prevented.

In the seatbelt retractor described in Patent Literatures 1 and 2 described above, the rotation of the rocking movement prevention member is controlled by the cam groove of the cam plate. In such a case, while the amount of rotation of the spool is relatively large, the amount of rotation of the rocking movement prevention member between the freely rocking position and the rocking movement prevention position is relatively small. Therefore, the cam groove has to be relatively long. However, when the cam groove is long, the outer diameter of the cam plate needs to be correspondingly larger in order to secure a space for forming the cam groove. Therefore, the seatbelt retractor becomes inevitably large.

Accordingly, there is proposed a seatbelt retractor that has a smaller and more compact structure for preventing end locking and that is capable of preventing end locking caused by the seatbelt withdrawal sensor effectively (for example, see Patent Literature 3). In the seatbelt retractor described in Patent Literature 3, a pair of stoppers serving as a rocking movement prevention member move in the radial direction passing through the center of rotation of the spool along a guide groove of an eccentric gear of the ELR-ALR switching mechanism while being controlled by a cam groove provided on a case at the time of rotation of the eccentric gear in association with retraction and withdrawal of the seatbelt. Then, when the seatbelt is retracted substantially entirely, the pair of stoppers prevent the rocking movement of a flywheel by pressing an inner peripheral surface of a ring portion provided on the flywheel as the seatbelt withdrawal sensor by being positioned in a large-diameter-side arcuate-shaped groove of the cam groove. When the seatbelt is withdrawn by a predetermined amount from the state of being entirely retracted, the stoppers are positioned in a small-diameter-side arcuate-shaped groove and hence do not press the inner peripheral surface of the ring portion thus allowing the flywheel to freely rock. In the seatbelt retractor described in Patent Literature 3, end locking caused by the belt withdrawal sensor may be prevented with a simple configuration using the rocking movement prevention member that moves in the direction of the diameter of the spool.

CITATION LIST

Patent Literature

PTL1: Japanese Unexamined Patent Application Publication No. 9-58410

PTL2: Japanese Unexamined Patent Application Publication No. 2008-213525

PTL3: Japanese Unexamined Patent Application Publication No. 2009-61810

SUMMARY OF INVENTION

Technical Problem

In the seatbelt retractor described in Patent Literature 3 described above, a ring portion pressed by a pair of stoppers is provided on a flywheel which is a seatbelt withdrawal sensor. In this manner, with the ring portion being provided on the flywheel, it is difficult to maintain consistency with regard to the position of the center of gravity of the flywheel. Therefore, the position of the center of gravity of the flywheel varies from one manufactured flywheel to another, and the operations of manufactured flywheels are affected by the inconsistencies in the position of the center of gravity.

In view of such circumstances, an object of the invention is to provide a seatbelt retractor capable of achieving effective prevention of end locking caused by a seatbelt withdrawal sensor and, simultaneously, forming a structure that prevents end locking to be smaller and that is more compact and that suppresses the influence of the position of the center of gravity of the seatbelt withdrawal sensor on the operation of the seatbelt withdrawal sensor, and a seatbelt apparatus having the same.

Solution to Problem

In order to solve the above-described problems, the present invention provides a seatbelt retractor including: a spool configured to retract a seatbelt; a locking mechanism configured to allow the rotation of the spool at the time of non-operation and prevent the rotation of the spool in a seatbelt withdrawal direction at the time of operation; a seatbelt withdrawal sensor configured to be operated when the seatbelt is abruptly withdrawn at least at a predetermined speed higher than in the normal condition at the time of start of the withdrawal of the seatbelt; and a lock operating mechanism configured to actuate the locking mechanism upon the operation of the seatbelt withdrawal sensor, wherein the lock operating mechanism at least includes a lock gear provided so as to be capable of rotating integrally with the spool at the time of non-operation and rotating relative to the spool at the time of operation, and configured to actuate the locking mechanism by rotating relative to the spool at the time of operation, the seatbelt withdrawal sensor is provided on the lock gear so as to be capable of making a rocking movement between a non-operating position where the rotation of the lock gear is allowed in both of a seatbelt retracting direction and the seatbelt withdrawal direction and an operating position where the rotation of the lock gear is prevented at least in the seatbelt withdrawal direction, the lock gear is provided with a rocking movement prevention member configured to prevent the rocking movement of the seatbelt withdrawal sensor so as to be rotatable between the operating position where the seatbelt withdrawal sensor is held at the non-operating position to prevent the locking movement toward the operating position at least at the time of retracting the entire amount or almost the entire amount of the seatbelt and the non-operating position configured to make the rocking movement of the seatbelt withdrawal sensor free at the time of withdrawing the seatbelt by a predetermined amount or more from the state in which the seatbelt is entirely retracted, a rocking movement prevention member control mechanism configured to control the rotation of the rocking movement prevention member is provided, and the rocking movement prevention control mechanism includes a rocking movement prevention control member provided so as to be rotatable between the non-operating position where the rocking movement prevention member is not controlled and the operating position where the rocking movement prevention member is controlled, and a rotation control member having a rocking movement prevention control member controller configured to perform slow rotation at a rotating speed lower than the rotating speed of the spool at the time of rotation of the spool and control the rotation of the rocking movement prevention control member at an outer peripheral edge.

The seatbelt retractor according to the present invention is characterized in that the rocking movement prevention control member is a control lever including an operating position setting lever provided between the non-operating position and the operating position so as to be rotatable and configured to be set to the operating position and a non-operating position setting lever configured to be set to the non-operating position, the rocking movement prevention control member controller of the rotation control member includes a first control lever controller coming into contact with the operating position setting lever and pressing the operating position setting lever to set the control lever to the operating position and a second control lever controller coming into contact with the non-operating position setting lever and pressing the non-operating position setting lever to set the control lever to the non-operating position.

Furthermore, the seatbelt retractor according to the present invention is characterized in that the non-operating position setting lever is a lever configured to rotate and control the rocking movement prevention member between the non-operating position and the operating position.

Furthermore, the seatbelt retractor according to the present invention is characterized in that the rocking movement prevention member includes a first rocking movement prevention lever and a second rocking movement prevention lever coupled to the first rocking movement prevention lever at a predetermined angle, and the first rocking movement prevention lever comes into contact with the non-operating position setting lever at the time of retraction of the seatbelt by the spool to set the rocking movement prevention member to the operating position, and the second rocking movement prevention lever comes into contact with the non-operating position setting lever at the time of withdrawal of the seatbelt to set the rocking movement prevention member to the non-operating position.

Still further, the seatbelt retractor according to the present invention is characterized in that the first rocking movement prevention lever and the second rocking movement prevention lever are coupled so as to be capable of rotating relative to each other, the first rocking movement prevention lever and the second rocking movement prevention lever are set and held at the predetermined angle in the normal condition, and the seatbelt is withdrawn in a state in which the control lever is set to the operating position and the rocking movement prevention member is set to the non-operating position, so that when the first rocking movement prevention lever comes into contact with the non-operating position setting lever, the first rocking movement prevention lever rotates relative to each other in the direction in which the first rocking movement prevention lever is bent with respect to the second rocking movement prevention lever.

Still further, the seatbelt retractor according to the present invention is characterized in that the rotation control member is an eccentric rotation control member configured to be rotated eccentrically about an axis of rotation of the spool at the time of the rotation of the spool.

Still further, the seatbelt retractor according to the present invention further includes an emergency lock-automatic lock switching mechanism configured to selectively switch between an emergency lock state and an automatic lock state, and is characterized in that the emergency lock-automatic lock switching mechanism includes a locked state switching eccentric rotation control member configured to rotate eccentrically with respect to an axis of rotation of the spool at the time of rotation of the spool to switch the emergency lock state and the automatic lock state, and the eccentric rotation control member is used also as the locked state switching eccentric rotation control member.

In contrast, the present invention provides a seatbelt apparatus according to the present invention including: a seatbelt configured to constrain an occupant; a seatbelt retractor configured to withdrawably retract the seatbelt and configured to actuate in the case of an emergency and prevent the withdrawal of the seatbelt; a tongue slidably supported by the seatbelt withdrawn from the seatbelt retractor; and a buckle provided on a vehicle body or a vehicle seat and allows disengageable engagement of the tongue, wherein the seatbelt retractor described above is used.

Advantages of the Invention

According to the seatbelt retractor of the present invention, the seatbelt retractor according to the invention configured as described above, the rotation of a rocking movement prevention member configured to prevent a rocking movement of a seatbelt withdrawal sensor is controlled by a rocking movement prevention member control mechanism. Then, the rocking movement prevention control mechanism includes a rocking movement prevention control member provided so as to be rotatable between the non-operating position where the rocking movement prevention member is not controlled and the operating position where the rocking movement prevention member is controlled, and a rotation control member having a rocking movement prevention control member controller configured to perform a deceleration rotation at a rotating speed lower than the rotating speed of the spool at the time of rotation of the spool and controlling the rotation of the rocking movement prevention control member. Therefore, the rocking movement prevention control member is controlled by the rocking movement prevention control member controller of the rotation control member. Accordingly, even though the helical cam groove of the seatbelt retractor described in Patent Literature 1 and 2 is not used, the rocking movement prevention lever may be set to the operating position configured to prevent the rocking movement of the seatbelt withdrawal sensor. Therefore, even when the amount of rotation of the rocking movement prevention control member between the non-operating position and the operating position is small while the amount of rotation of the spool is relatively large, the seatbelt retractor may be formed to be small and compact.

Since the seatbelt withdrawal sensor is not provided with a ring portion as in the seatbelt retractor described in Patent Literature 3 described above and other member for prevention the rocking movement of the seatbelt withdrawal sensor, the positions of the centers of gravity of the seatbelt withdrawal sensors can be made constant. Therefore, influence of the center of gravity of the seatbelt withdrawal sensor on the operation of the seatbelt withdrawal sensor may effectively be suppressed.

In this manner, according to the seatbelt retractor of the present invention, prevention of end locking caused by the seatbelt withdrawal sensor may be performed further effectively, and the structure for preventing end locking may be formed to be smaller and more compact. In addition, influence of the position of the center of gravity of the seatbelt withdrawal sensor on the operation of the seatbelt withdrawal sensor may be suppressed effectively.

When the lock gear rotates in the seatbelt withdrawal direction by the withdrawal of the seatbelt and hence the first rocking movement prevention lever interferes with (abuts against) the non-operating position setting lever of the control lever in a state in which the control lever is set to the operating position and the first rocking movement prevention lever and the second rocking movement prevention lever are set to the non-operating position, the first rocking movement prevention lever is bent with respect to the second rocking movement prevention lever. Accordingly, even though the first rocking movement prevention lever interferes with the non-operating position setting lever, the lock gear can be rotated further in the seatbelt withdrawal direction. Therefore, the amount of rotation of the spool (that is, the amount of withdrawal of the seatbelt) can further be increased, and the first rocking movement prevention lever and the second rocking movement prevention lever may be set to the non-operating positions in earlier stages when the seatbelt is withdrawn in the state in which the entire amount of the seatbelt is retracted and the operating positions of the first rocking movement prevention lever and the second rocking movement prevention lever are set.

Furthermore, when the seatbelt retractor is a retractor configured to selectively switch the emergency lock state and the automatic lock state, the rocking movement prevention control member configured to control the rocking movement prevention member is controlled by the locked state switching eccentric rotation control member of the emergency lock-automatic lock switching mechanism. In other words, the rotation control member configured to control the rocking movement prevention control member is used also as the locked state switching eccentric rotation control member of the emergency lock-automatic lock switching mechanism. Accordingly, the number of components may be reduced, and simplification of the structures of the emergency lock-automatic lock switching mechanism and end locking preventing mechanism of the seatbelt withdrawal sensor is enabled. Consequently, the seatbelt retractor may be formed to be small and compact.

In contrast, according to the seatbelt apparatus provided with the seatbelt retractor of this example, since end locking caused by the seatbelt withdrawal sensor can be prevented further effectively, the operability of the seatbelt is improved and the action of fastening the seatbelt by the occupant can be performed smoothly and effectively.

Also, since the seatbelt retractor may be formed to be small and compact, flexibility of layout of the respective components of the seatbelt apparatus may be increased.

DESCRIPTION OF EMBODIMENTS

Figure 1:
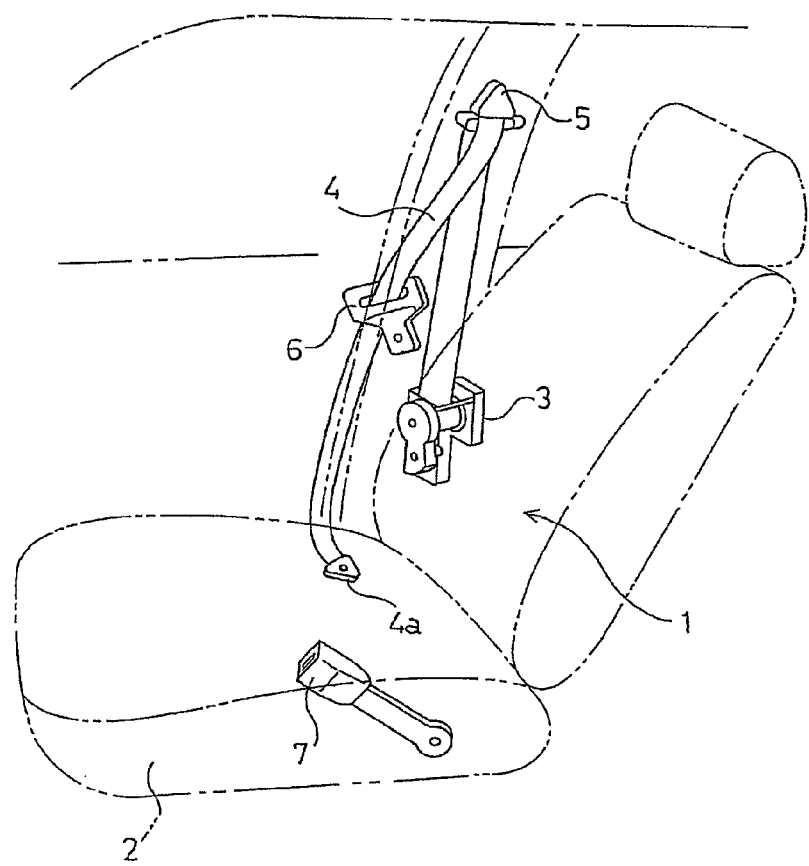
FIG. 1 is a perspective view schematically illustrating a seatbelt apparatus having an example of an embodiment of a seatbelt retractor according to the invention.

Referring now to the drawings, modes for carrying out the invention will be described.

FIG. 1 is a drawing schematically illustrating a seatbelt apparatus having an example of an embodiment of a seatbelt retractor according to the invention.

As illustrated in FIG. 1, a seatbelt apparatus 1 of this example is basically the same as the seatbelt apparatus described in Patent Literature 1 as well as a three-point seatbelt apparatus known in the related art. In the drawing, reference numeral 1 denotes a seatbelt apparatus, reference numeral 2 denotes a vehicle seat, reference numeral 3 denotes a seatbelt retractor disposed in the vicinity of the vehicle seat 2, reference numeral 4 denotes a seatbelt retracted on the seatbelt retractor 3 so as to be capable of being withdrawn and configured to be fixed to a floor of a vehicle body or to the vehicle seat 2 via a seatbelt anchor 4a provided at a distal end thereof, reference numeral 5 denotes a guide anchor configured to guide the seatbelt 4 withdrawn from the seatbelt retractor 3 toward the shoulder of an occupant, reference numeral 6 denotes a tongue supported by the seatbelt 4 guided from the guide anchor 5 so as to be capable of sliding thereon, and reference numeral 7 denotes a buckle fixed to the floor of the vehicle body or the vehicle seat and configured to allow the tongue 6 to be inserted therein and engaged therein so as to be engageable and disengageable.

A fastening operation and a releasing operation of the seatbelt 4 in the seatbelt apparatus 1 are the same as those of the seatbelt apparatus in the related art.

Figure 2:
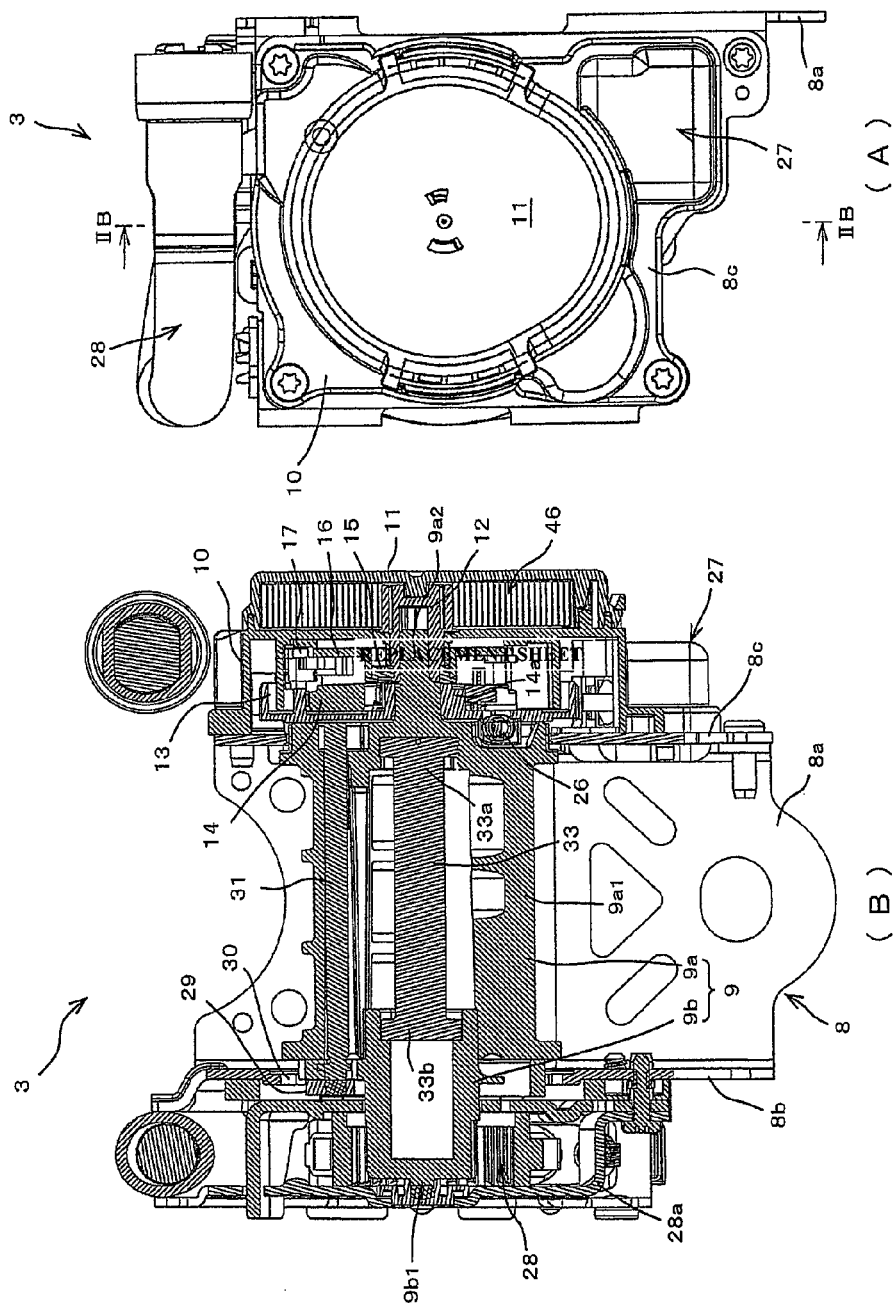
FIG. 2(A) is a right side view of an example of the embodiment of the seatbelt retractor according to the invention.
FIG. 2(B) is a cross-sectional view taken along the line IIB-IIB in FIG. 2(A).
Figure 3:
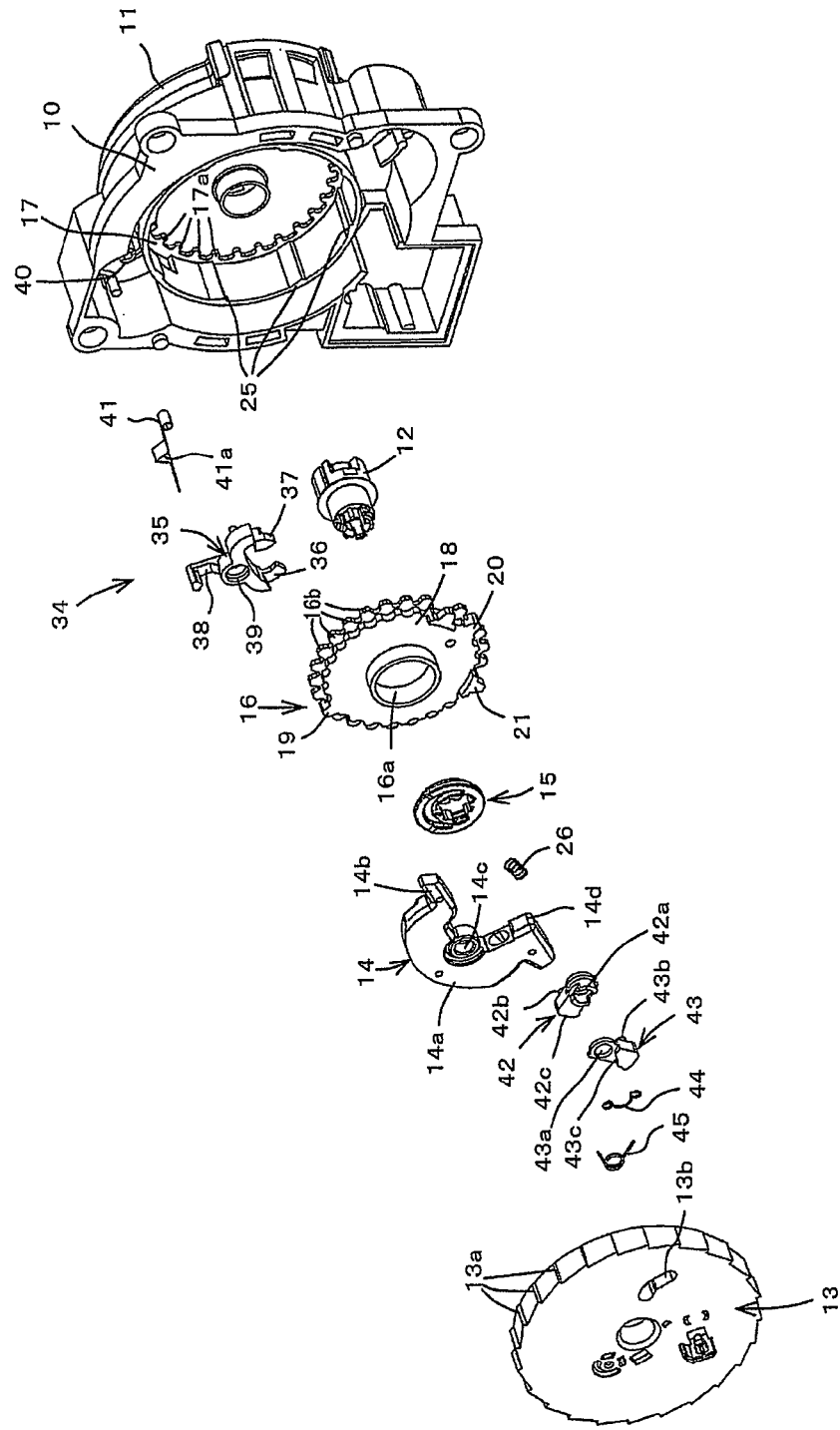
FIG. 3 is an exploded perspective view of end locking preventing mechanism by a flywheel of the seatbelt retractor of this example.

FIG. 2(A) is a right side view of an example of the embodiment of the seatbelt retractor according to the invention, and FIG. 2(B) is a cross-sectional view taken along the line IIB-IIB in FIG. 2(A). FIG. 3 is an exploded perspective view of end locking preventing mechanism implemented by a flywheel of the seatbelt retractor of this example.

As illustrated in FIG. 2(A) and FIG. 2(B), the seatbelt retractor 3 of this example includes a back plate 8a, and an angular U-shaped frame 8 including left and right side walls 8b, 8c projecting from the two side ends of the back plate 8a in a direction orthogonal thereto in the same manner as a general seatbelt retractor known in the related art.

A spool 9 configured to retract the seatbelt 4 is disposed through respective circular openings of the both side walls 8b, 8c of the frame 8 so as to be rotatable. The spool 9 includes a first spool portion 9a and a second spool portion 9b arranged in the axial direction so as to be concentric with the left end of the first spool portion 9a an so as to be rotatable with respect to each other. The first spool portion 9a includes a seatbelt retracting portion $9a_1$ configured to retract the seatbelt 4.

An end of an axis of rotation $9a_2$ of the first spool portion 9a is rotatably supported by a cover 11 of the case 10 mounted on the side wall 8c integrally with a bush 12 via the bush 12. A lock gear 13 is fitted and supported by the axis of rotation $9a_2$ concentrically with the axis of rotation $9a_2$. In this case, in the same manner as the lock gear known in the related art, the lock gear 13 and the axis of rotation $9a_2$ are integrally rotated if the rotation of the lock gear 13 is not prevented, and the axis of rotation $9a_2$ rotates relative to the lock gear 13 if the rotation of the lock gear 13 is prevented. As illustrated in FIG. 3, a predetermined number of ratchet teeth 13a are formed in a ring shape on an outer periphery of the lock gear 13, and a cam hole 13b is formed on a side surface of the lock gear 13.

Figure 4:
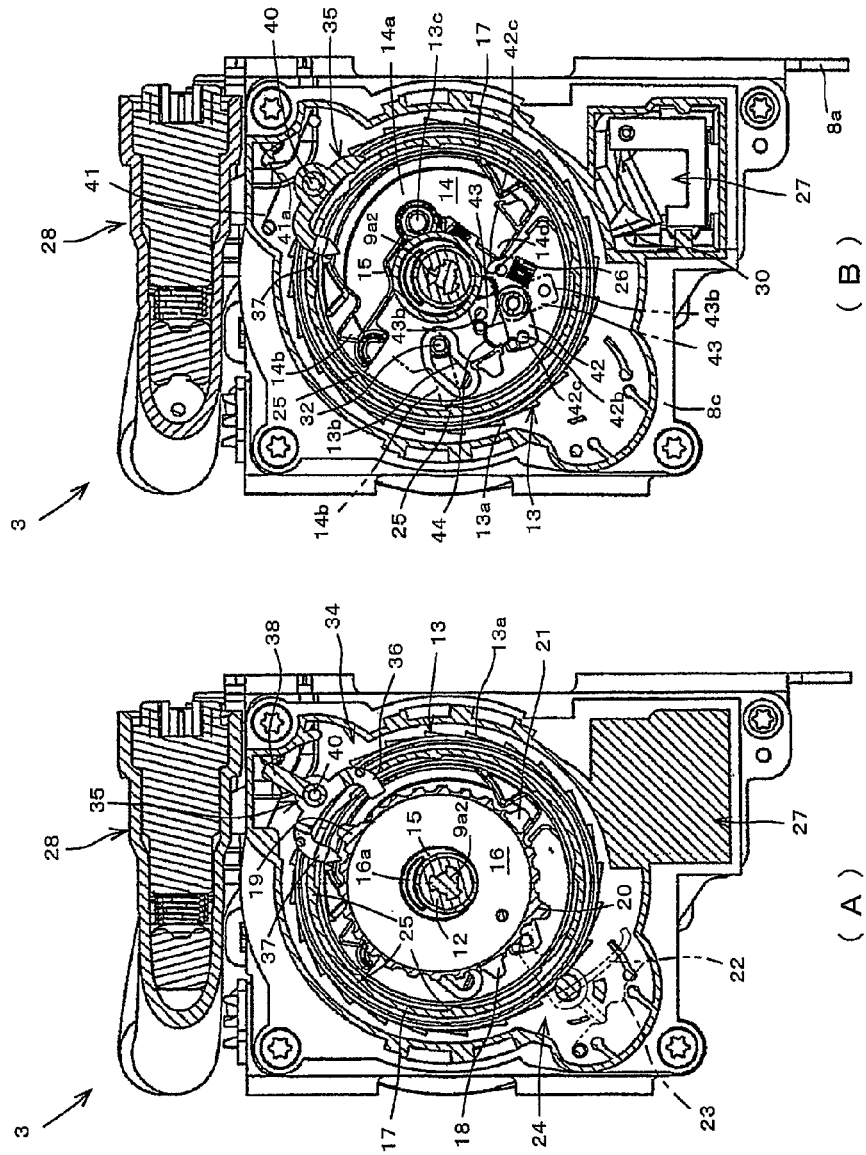
FIG. 4(A) is a right side view illustrating a cross-section taken at a position where a control lever and an eccentric gear are visible.
FIG. 4(B) is a right side view illustrating a cross section at a position where the flywheel and first and second rocking movement prevention levers are visible.

As illustrated in FIG. 2(A), FIG. 3, and FIG. 4(B), a flywheel 14 is rockably supported by the lock gear 13. The flywheel 14 is an inertial member and constitutes a seatbelt withdrawal sensor (a so-called webbing sensor). In this case, the flywheel 14 includes an inertia mass portion 14a and a locking claw 14b provided on the inertia mass portion 14a. The inertia mass portion 14a is rockably supported by a projecting shaft 13c formed on the lock gear 13 that fits into a through hole 14c.

An eccentric disk 15 is fixedly fitted on the axis of rotation $9a_2$ on the first spool portion 9a via the bush 12. A through hole 16a of a flat eccentric gear 16 (corresponding to a rotation control member and an eccentric rotation control member of the present invention) is fitted and supported on the outer periphery of the eccentric disk 15 so as to rotate relative to the eccentric disk 15.

The eccentric gear 16 includes a predetermined number of outer teeth 16b. Some of the outer teeth 16b may be engageable with some of inner teeth 17a of a ring gear 17 formed on the case 10 concentrically with the spool 9 so as to have an outer diameter larger than an outer diameter of the eccentric gear 16. The eccentric gear 16 is configured to rotate at a low speed having an absolute value smaller than an absolute value of the rotating speed of the spool 9 in a direction opposite to the direction of rotation of the spool 9 by the rotation of the eccentric disk 15 (integral rotation with the spool 9 in the same direction) and the engagement between the outer teeth 16b and the inner teeth 17a when the spool 9 rotates in one direction. An outer peripheral edge portion of the eccentric gear 16 is provided with a first lever operating cam 18, a second lever operating cam 19, a third lever operating cam 20 (corresponding to a rocking movement prevention control member controller and a first control lever controller of the invention) and a fourth lever operating cam 21 (the rocking movement prevention control member controller and a second control lever controller of the invention).

As illustrated in a two-dot chain line in FIG. 4(A), a switching lever 22 configured to switch between an ELR function and an ALR function is rotatably supported on the case 10. The switching lever 22 is selectively supported at two positions by a switching lever position control spring 23. The eccentric disk 15, the eccentric gear 16, the ring gear 17, the first lever operating cam 18, the second lever operating cam 19, the switching lever 22, and the switching lever position control spring 23 constitute an ELR-ALR switching mechanism 24 (corresponding to the emergency lock-automatic lock switching mechanism of the present invention) configured to selectively switch between the ELR function (emergency locked state) and the ALR function (automatically locked state).

The ELR-ALR switching mechanism 24 is the same as the ELR-ALR switching mechanism 24 configured to switch between the ELR function and the ALR function described in Patent Literature 1. The detailed structure and detailed operation of the ELR-ALR switching mechanism 24 can be easily understood by referring to the description thereof in Patent Literature 1, so that the description thereof is omitted. In such a case, the first lever operating cam 18 as described above switches the function from the ELR function to the ALR function, and the second lever operating cam 19 switches the function from the ALR function to the ELR function. The switching lever 22 is displaced in the direction of an axis of the spool 9 with respect to the third lever operating cam 20 and the fourth lever operating cam 21, and is set to a position at which it cannot come into contact with the third lever operating cam 20 and the fourth lever operating cam 21.

The flywheel 14 is provided so that the locking claw 14b thereof provided on the case 10 so as to be engageable with any one of predetermined ratchet teeth 25 in the form of inner teeth arranged in a ring shape in the same manner as the webbing sensor known in the related art. In such a case, at the time of non-operation of the seatbelt retractor 3 (when the seatbelt 4 is entirely retracted) and at the time of seatbelt withdrawal at a withdrawing acceleration equal to or lower than the normal withdrawal acceleration for fastening the seatbelt, the flywheel 14 rotates integrally with the lock gear 13 (that is, the spool 9) but does not rock relatively with respect thereto, and the locking claw 14b is maintained at a non-operating position illustrated in FIG. 4(B) in which the locking claw 14b does not engage the ratchet teeth 25. At the time of abrupt seatbelt withdrawal at a relatively large withdrawal acceleration exceeding the normal withdrawal acceleration of the seatbelt 4 described above, the flywheel 14 rocks relatively with respect to the lock gear 13 due to an inertia delay of an inertia mass 14a with respect to the rotation of the lock gear 13 (that is, the spool 9), and is set to an operating position indicated by a two-dot chain line in FIG. 4(B) in which the locking claw 14b engages the ratchet teeth 25. By the engagement of the locking claw 14b with the ratchet teeth 25, the rotation of the seatbelt withdrawal direction of the lock gear 13 is prevented. Accordingly, at the time of the abrupt withdrawal of the seatbelt 4, the rotation of the spool 9 in the seatbelt withdrawal direction is prevented, and hence the withdrawal of the seatbelt 4 is disabled. In this case, the flywheel 14 is urged constantly toward the non-operating position by a spring 26 provided between the flywheel 14 and the lock gear 13 in a contracted state and is maintained at the non-operating position in the normal state. Then, at the time of the above-described abrupt withdrawal of the seatbelt 4, the flywheel 14 rocks to the operating position against an urging force of the spring 26.

In addition, as illustrated in FIGS. 2(A) and (B) and FIGS. 4(A) and (B), a vehicle sensor 27 as a deceleration sensing mechanism is provided on the side wall 8c. The vehicle sensor 27 is the same as the vehicle sensor described in Patent Literature 1 described above. Therefore, detailed structure and detailed operation of the vehicle sensor 27 can be easily understood by referring to the description thereof given in Patent Literature 1, so that the description thereof is omitted.

As illustrated in FIG. 2(A) and FIG. 2(B), a pretensioner 28 known in the related art is provided on the side wall 8b of the frame 2 and on an upper portion of the frame 2. The axis of rotation $9b_1$ of the second spool portion 9b is rotatably supported by a case 28a of the pretensioner 28. The pretensioner 28 is actuated in the case of an emergency, and an actuating force thereof is transmitted to the second spool portion 9b, and the spool 9 rotates in the seatbelt retracting direction. Accordingly, the seatbelt 4 is retracted in an initial stage of the emergency, and the tension of the seatbelt is increased.

The second spool portion 9b is rotatably supported by a pawl 29 known in the related art. The pawl 29 is configured to be rotatable between a position at which it engages any one of predetermined teeth 30 formed on an inner peripheral surface of the opening of the side wall 8b and a position at which it does not engage any of the teeth 30. Furthermore, as illustrated in FIG. 2(B) and FIG. 4(B), the pawl 29 is coupled to a cam follower 32 via a crank-shaped coupling shaft 31 extending through the spool 9 in the axial direction. The operation of the cam follower 32 is controlled by the cam hole 13b of the lock gear 13.

Then, when the first spool portion 9a and the lock gear 13 rotate integrally in the seatbelt withdrawal direction, the pawl 29 is held at a position incapable of engaging the teeth 30. Also, when the first spool portion 9a rotates relative to the lock gear 13 in the seatbelt withdrawal direction, the pawl 29 is set to a position engageable with the teeth 30 by the cam follower 32 controlled by the cam hole 13b of the lock gear 13. When the pawl 29 does not engage the teeth 30, the second spool portion 9b is rotatable either in the seatbelt retracting direction or the seatbelt withdrawal direction, and when the pawl 29 engages the teeth 30, at least the rotation of the second spool portion 9b in the seatbelt withdrawal direction is disabled. The locking mechanism of the present invention is configured to allow the rotation of the spool 9 by the pawl 29 and the teeth 30 in the case of an emergency and prevent the rotation of the spool 9 in the seatbelt withdrawal direction at the time of operation. The lock gear 13, the coupling shaft 32, and the cam follower 32 constitute a lock operating mechanism of the present invention. Since the operation control of the pawl 29 by the cam follower 32 and the cam hole 13b is known in the related art and may be configured easily and, in addition, is not a characteristic portion of the present invention although it is a component of the present invention, detailed description thereof is omitted.

Furthermore, as illustrated in FIG. 2(B), a torsion bar 33 known in the related art is bridged between the first and second spool portions 9a and 9b. A right end portion 33a is rotatable integrally with the first spool portion 9a of the torsion bar 33 in FIG. 2(B), and a left end portion 33b is rotatable integrally with the second spool portion 9b of the torsion bar 33 in FIG. 2(B).

Then, when the pawl 29 engages the teeth 30 in the case of an emergency and the rotation of the second spool portion 9b in the seatbelt withdrawal direction is disabled, if the first spool portion 9a makes an attempt to rotate in the seatbelt withdrawal direction upon the withdrawal of the seatbelt 4 by the inertia of the occupant, the torsion bar 33 is subject to a torsional deformation to absorb and alleviate impact energy applied to the occupant by the seatbelt 4.

Incidentally, the seatbelt retractor 3 of this example is provided with end locking preventing mechanism configured to prevent end locking described above generated by the rocking movement of the flywheel 14 of the seatbelt withdrawal sensor at the time of the retraction of the entire amount of the seatbelt retractor 3 after release of fastening of the seatbelt.

As illustrated in FIG. 3, FIGS. 4(A) and 4(B), end locking preventing mechanism 34 of the flywheel 14 includes a control lever 35 of a substantially T-shape, which is a rocking movement prevention control member of the present invention. The control lever 35 includes a control lever on lever 36 as an operating position setting lever of the present invention, a control lever off flywheel control lever 37 as a non-operating position setting lever of the present invention (corresponding to the rocking movement prevention control member controller and the second control lever controller of the present invention), a projecting portion 38, and a cylindrical axis of rotation 39. The control lever 35 is provided rotatably on the case 10 by the axis of rotation 39 rotatably supported by a projecting shaft 40 of the case 10. The control lever 35 is positioned by the projecting portion 38 engaging a depression 41a formed on a lever position control spring 41 formed of a leaf spring.

In other words, when the projecting portion 38 engages the depression 41a, the control lever 35 is positioned and held at a non-operating position where the control lever on lever 36 is capable of coming into contact with the third lever operating cam 20. At this time, the control lever off flywheel control lever 37 is at a position incapable of coming into contact with the fourth lever operating cam 21. When the projecting portion 38 comes out from the depression 41a and is at a predetermined position, the control lever 35 is positioned and held at an operating position where the control lever off flywheel control lever 37 is capable of coming into contact with the fourth lever operating cam 21. At this time, the control lever on lever 36 is at a position not substantially pressed by the third lever operating cam 20. The control lever on lever 36 and the control lever off flywheel control lever 37 are displaced in position in the direction of the axis of the spool 9 with respect to both of the first lever operating cam 18 and the second lever operating cam 19 irrespective of the position of the control lever 35 at the non-operating position or at the operating position, and are set to positions which cannot come into contact neither with the first lever operating cam 18 nor the second lever operating cam 19. The eccentric gear 16 is used also as both of eccentric gears of the ELR-ALR switching mechanism 24 and end locking preventing mechanism 34. Also, a rocking movement prevention member control mechanism of the present invention is configured by the control lever 35 and the eccentric gear 16.

As illustrated in FIG. 3 and FIGS. 4(A) and 4(B), the seatbelt retractor 3 includes a pair of first rocking movement prevention lever 42 and a second rocking movement prevention lever 43 as rocking movement prevention member. The first rocking movement prevention lever 42 includes a cylindrical axis of rotation 42a, a pressed pin 42b, and a flywheel holding portion 42c (distal end edge of the first rocking movement prevention lever 42) capable of coming into contact with a held portion 14d of the flywheel 14 to prevent the rotation (rocking movement) of the flywheel 14. The second rocking movement prevention lever 43 includes a circular rotation hole 43a, a pressed pin 43b, and a shouldered portion 43c. Then, by the rotation hole 43a of the second rocking movement prevention lever 43 rotatably fitted to the axis of rotation 42a of the first rocking movement prevention lever 42, the first rocking movement prevention lever 42 and the second rocking movement prevention lever 43 are coupled so as to be rotatable with respect to each other by a predetermined angle. As illustrated in FIG. 6(I)(B) described later, the first rocking movement prevention lever 42 and the second rocking movement prevention lever 43 are rotatably supported by a supporting shaft (not illustrated) provided on the lock gear 13 in a state of being coupled in this manner. Therefore, the first rocking movement prevention lever 42 and the second rocking movement prevention lever 43 rotate integrally with the lock gear 13 about the axis of rotation of the spool 9.

An arcuate-shaped first lever spring 44 is provided in a contract manner between the pressed pin 42b of the first rocking movement prevention lever 42 and the pressed pin 43b of the second rocking movement prevention lever 43. In a free state in which a force which causes the first rocking movement prevention lever 42 and the second rocking movement prevention lever 43 to rotate relative to each other is not applied, a side edge of the first rocking movement prevention lever 42 comes into contact with the shouldered portion 43c of the second rocking movement prevention lever 43 by the urging force of the first lever spring 44 as illustrated in FIG. 4(B), so that the first rocking movement prevention lever 42 and the second rocking movement prevention lever 43 are held in a state of being opened at a right angle or at a substantially right angle, which is a predetermined angle, and are not further opened. When the force of causing the first rocking movement prevention lever 42 and the second rocking movement prevention lever 43 to rotate with each other is applied thereto, the first rocking movement prevention lever 42 and the second rocking movement prevention lever 43 rotate relative to each other in the direction of bending against the urging force of the first lever spring 44.

A V-shaped second lever spring 45 is provided between the pressed pin 43b of the second rocking movement prevention lever 43 and the lock gear 13 in a contract manner. In a free state in which a force which causes the second rocking movement prevention lever 43 to rotate is not applied, the first rocking movement prevention lever 42 and the second rocking movement prevention lever 43 are set and held at a non-operating position illustrated in a solid line in FIG. 4(B) by an urging force of the second lever spring 45. Therefore, the further clockwise rotation of the second rocking movement prevention lever 43 in FIG. 4(B) is prevented at the non-operating position of the first rocking movement prevention lever 42 and the second rocking movement prevention lever 43.

At the non-operating position of the first rocking movement prevention lever 42 and the second rocking movement preventing lever 43, the flywheel holding portion 42c of the first rocking movement prevention lever 42 takes a position not opposing the held portion 14d of the flywheel 14. In other words, at the non-operating position of the flywheel holding portion 42c of the first rocking movement prevention lever 42, the flywheel holding portion 42c of the first rocking movement prevention lever 42 does not prevent the rocking movement of the flywheel 14. When a force larger than the urging force of the second lever spring 45 is applied to the second rocking movement preventing lever 43, the first rocking movement prevention lever 42 and the second rocking movement prevention lever 43 are set and held at an operating position illustrated in a two-dot chain line in FIG. 4(B). At the operating position of the first rocking movement prevention lever 42 and the cam follower 32, the flywheel holding portion 42c of the first rocking movement prevention lever 42 takes a position opposing the held portion 14d of the flywheel 14 almost without a gap therebetween. In other words, at the operating position of the flywheel holding portion 42c of the first rocking movement prevention lever 42, the flywheel holding portion 42c of the first rocking movement prevention lever 42 are capable of prevention the rocking movement of the flywheel 14 in the direction in which the locking claw 14b of the flywheel 14 engages the ratchet teeth 25.

As illustrated in FIG. 2(B), the cover 11 is provided with a spring mechanism 46 known in the related art as a spring mechanism, and the spring mechanism 46 urges the spool 9 constantly in the seatbelt retracting direction by the urging force thereof transmitted to the spool 9 via the bush 12. The seatbelt 4 is retracted by an entire amount on the spool 9 when the seatbelt is not fastened by the urging force of the spring mechanism 46.

Figure 5:
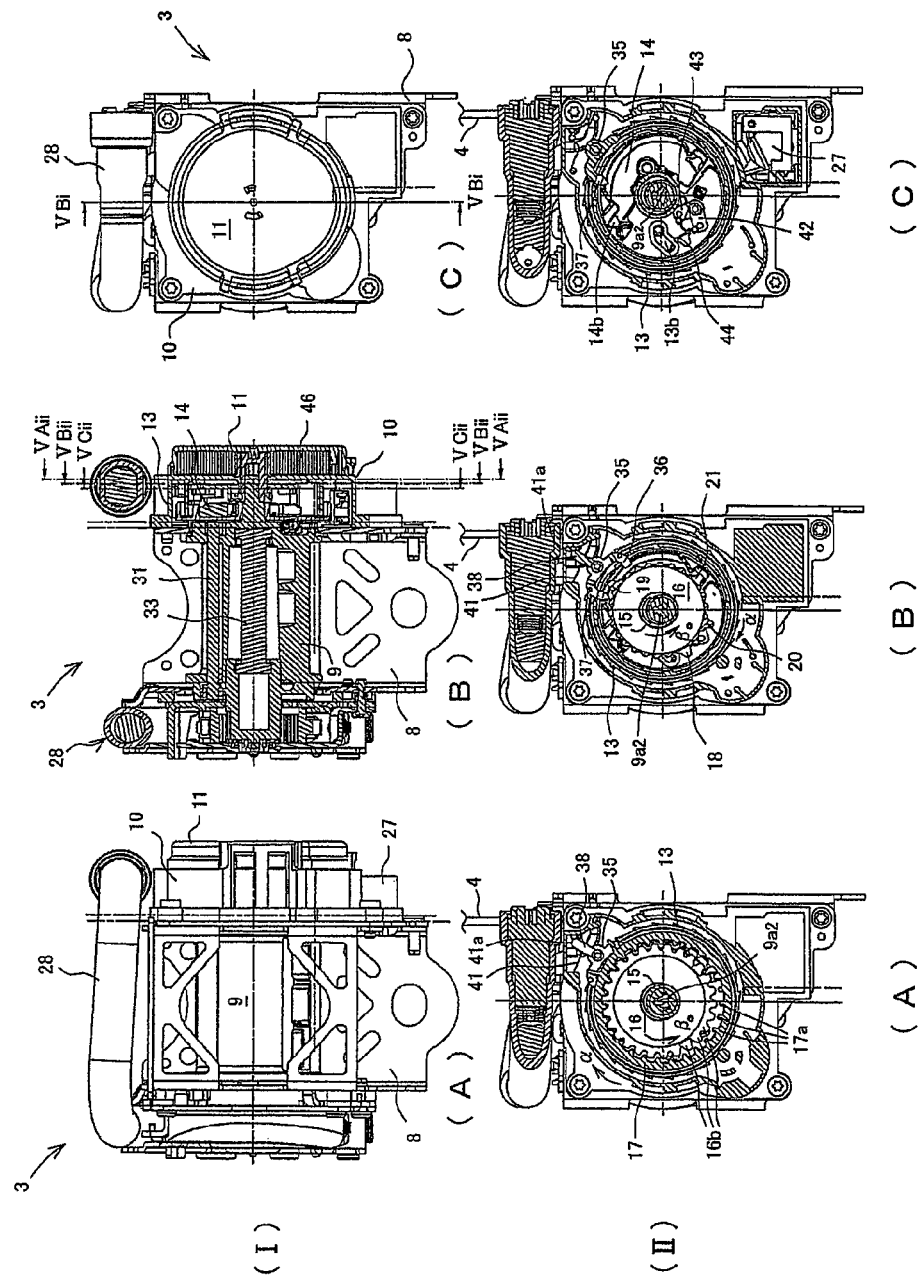
FIG. 5(I)(A) is a front view of the seatbelt retractor of this example, FIG. 5(I) (B) is a cross-sectional view taken along the line VBi-VBi of FIG. 5(I)(C), FIG. 5(I)(C) is a right side view of the seatbelt retractor of this example, FIG. 5(II)(A) to FIG. 5(II)(C) are a cross-sectional view taken along the line VAii-VAii in FIG. 5(I)(B), a cross-sectional view taken along the line VBii-VBii in FIG. 5(I)(B), and a cross-sectional view taken along the line VCii-VCii in FIG. 5(I)(B), respectively.
Figure 14:
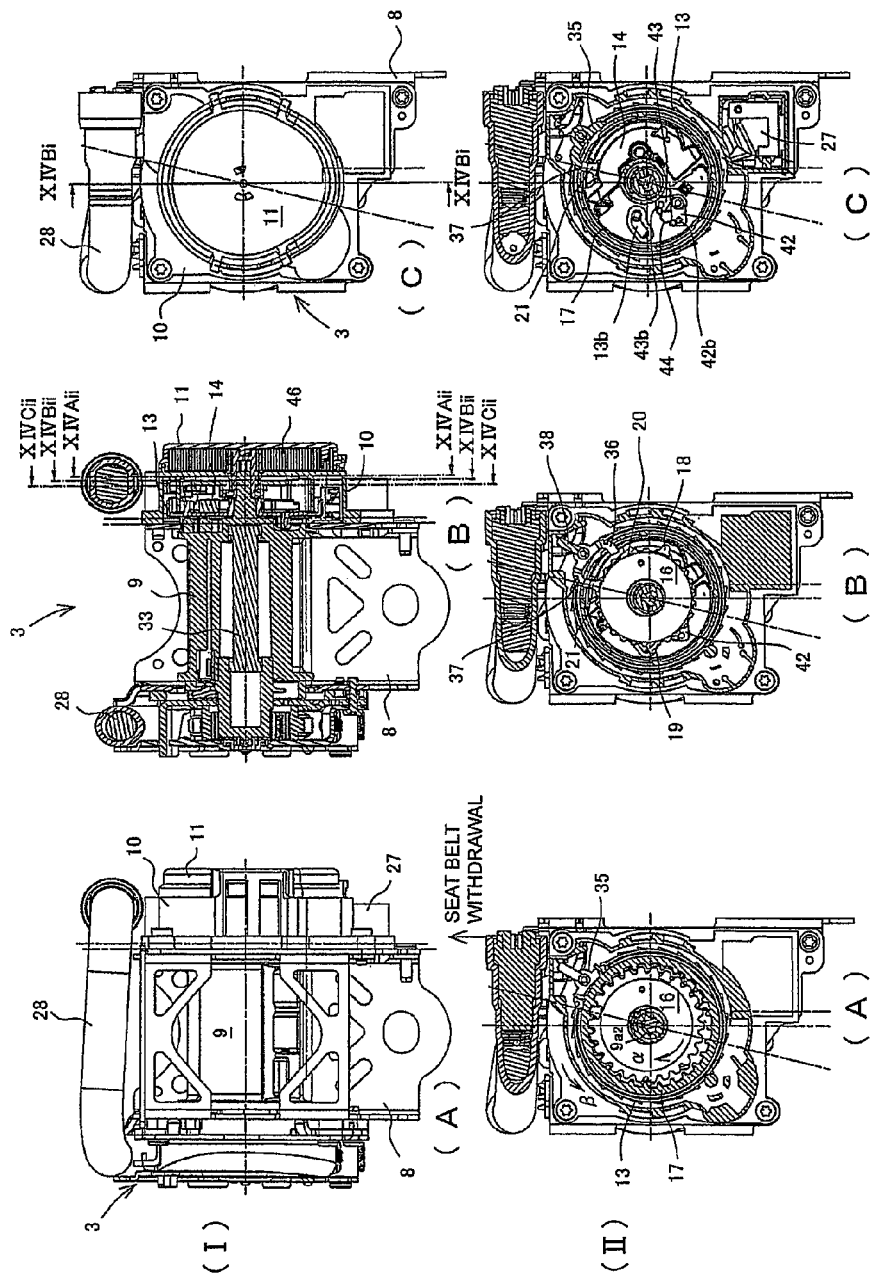
FIG. 14(I)(A) is a front view of the seatbelt retractor of this example, FIG. 14(I)(B) is a cross-sectional view taken along the line XIVBi-XIVBi of FIG. 14(I) (C), FIG. 14(I) (C) is a right side view of the seatbelt retractor of this example, FIG. 14(II)(A) to FIG. 14(II)(C) are a cross-sectional view taken along the line XIVAii-XIVAii in FIG. 14(I)(B), a cross-sectional view taken along the line XIVBii-XIVBii in FIG. 14(I) (B), and a cross-sectional view taken along the line XIVCii-XIVCii in FIG. 14(I)(B), respectively.

Subsequently, an operation of end locking preventing mechanism 34 configured to prevent end locking caused by the flywheel (webbing sensor) 14 will be described. FIG. 5 and FIG. 14 are drawings explaining the operation of end locking preventing mechanism 34, respectively.

When the entire amount of the seatbelt 4 (the maximum withdrawable amount) is withdrawn from the seatbelt retractor 3, the seatbelt retractor 3 is brought into a state illustrated in FIG. 5. At this time, the seatbelt retractor 3 is switched from the ELR function to the ALR function by the operation of the ELR-ALR switching mechanism 24. In the state of the seatbelt retractor 3, the control lever 35 is set and held at the initial non-operating position where the projecting portion 38 engages the depression 41a of the lever position control spring 41 as illustrated in FIGS. 5(11)(A) and (B). As illustrated in FIG. 5(11)(C), the pair of the first rocking movement prevention lever 42 and the second rocking movement prevention lever 43 are opened by a substantially right angle, which is maximum, and is set and held at the non-operating position. Furthermore, the flywheel 14 is at the non-operating position with respect to the ring gear 17.

Figure 6:
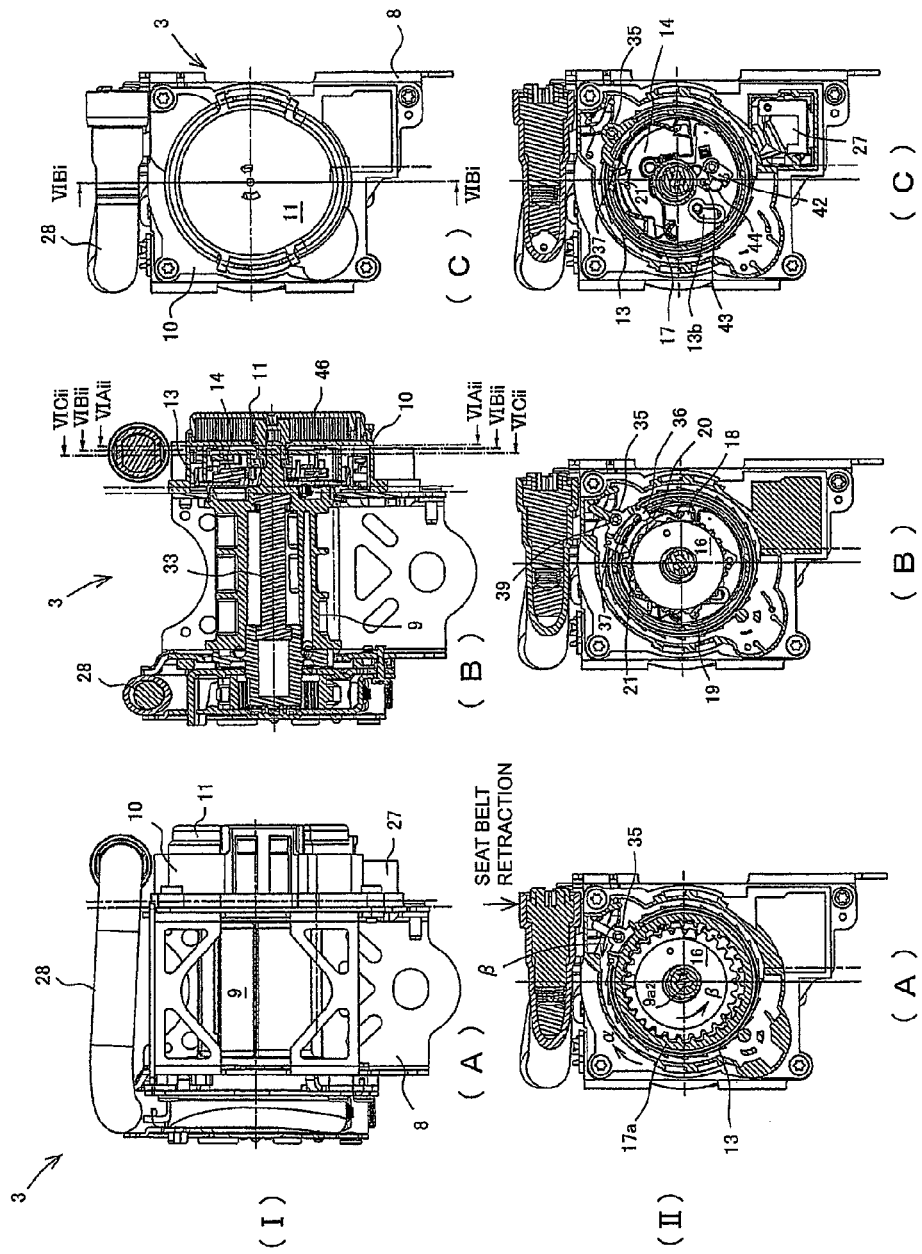
FIG. 6(I)(A) is a front view of the seatbelt retractor of this example, FIG. 6(I)(B) is a cross-sectional view taken along the line VIBi-VIBi of FIG. 5(I)(C), FIG. 6(I)(C) is a right side view of the seatbelt retractor of this example, FIG. 6(II)(A) to FIG. 6(II)(C) are a cross-sectional view taken along the line VIAii-VIAii in FIG. 6(I)(B), a cross-sectional view taken along the line VIBii-VIBii in FIG. 6(I)(B), and a cross-sectional view taken along the line VICii-VICii in FIG. 6(I)(B), respectively.
Figure 7:
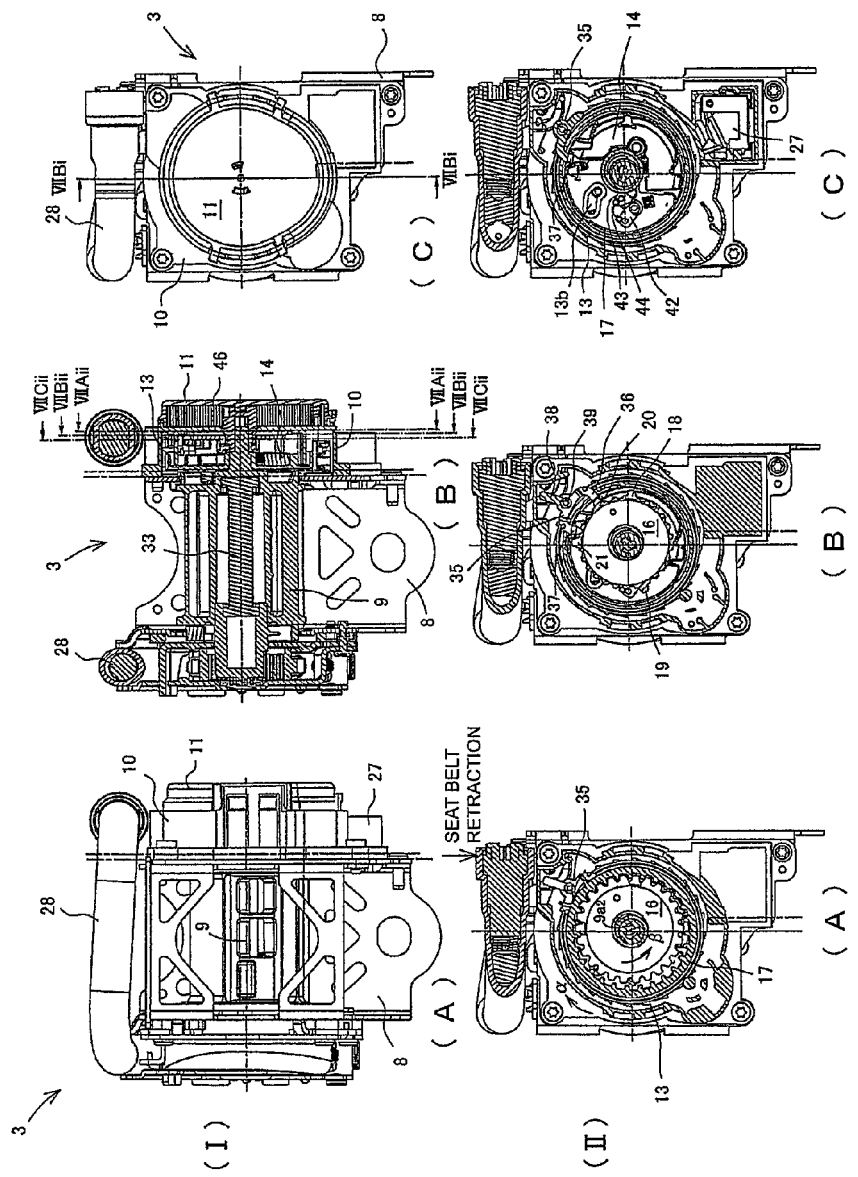
FIG. 7(I)(A) is a front view of the seatbelt retractor of this example, FIG. 7(I)(B) is a cross-sectional view taken along the line VIIBi-VIIBi of FIG. 7(I)(C), FIG. 7(I)(C) is a right side view of the seatbelt retractor of this example, FIG. 7(II)(A) to FIG. 7(II)(C) are a cross-sectional view taken along the line VIIAii-VIIAii in FIG. 7(I)(B), a cross-sectional view taken along the line VIIBii-VIIBii in FIG. 7(I)(B), and a cross-sectional view taken along the line VIICii-VIICii in FIG. 7(I)(B), respectively.

The seatbelt 4 is retracted by the spool 9 by the rotation of the spool 9 clockwise α (in the seatbelt retracting direction) in FIG. 5(II)(A) and FIG. 5(II)(B) from the state in which the entire amount of the seatbelt 4 is withdrawn by the urging force of the spring mechanism 46. At this time, the lock gear 13, the flywheel 14, the first rocking movement prevention lever 42, and the second rocking movement prevention lever 43 rotate integrally with the spool 9 in the same direction α as the rotation of the spool 9. Also, the eccentric gear 16 rotates in counterclockwise β simultaneously in FIG. 5(II)(A) and FIG. 5(II)(B). Then, when the spool 9 rotates by a predetermined amount in the seatbelt retracting direction (that is, the seatbelt 4 is retracted by a predetermined amount), the third lever operating cam 20 comes into contact with the control lever on lever 36 as illustrated in FIG. 6(II)(B), and pushes the control lever on lever 36 upward. Accordingly, the control lever 35 starts counterclockwise β rotation in FIG. 6(II)(A) about the axis of rotation 39. Then, when the spool 9 rotates further in the seatbelt retracting direction, the control lever 35 completes the rotation thereof as illustrated in FIG. 7(II)(B), and is set and held at the operating position.

Figure 8:
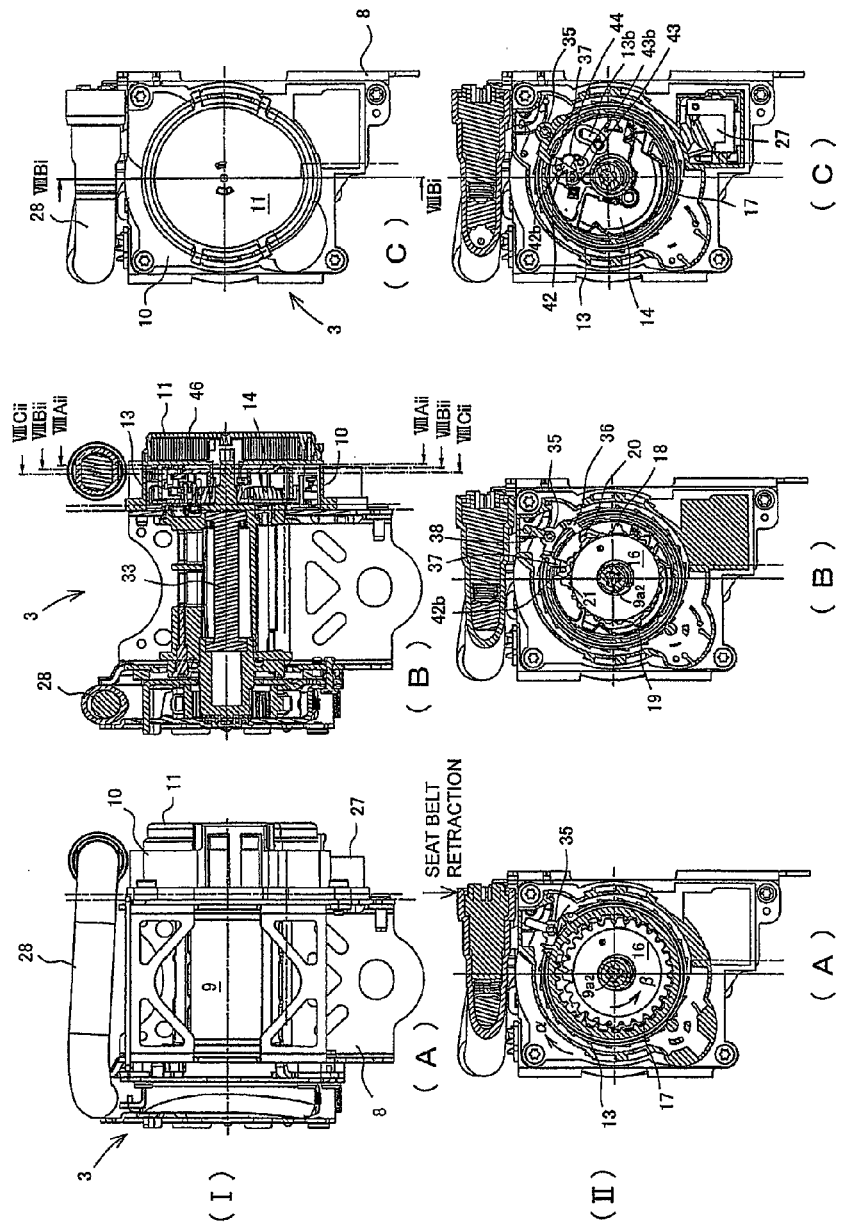
FIG. 8(I)(A) is a front view of the seatbelt retractor of this example, FIG. 8(I)(B) is a cross-sectional view taken along the line VIIIBi-VIIIBi of FIG. 8(I)(C), FIG. 8(I)(C) is a right side view of the seatbelt retractor of this example, FIG. 8(II)(A) to FIG. 8(II)(C) are a cross-sectional view taken along the line in FIG. 8(I)(B), a cross-sectional view taken along the line VIIIBii-VIIIBii in FIG. 8(I)(B), and a cross-sectional view taken along the line VIIICii-VIIICii in FIG. 8(I)(B), respectively.
Figure 9:
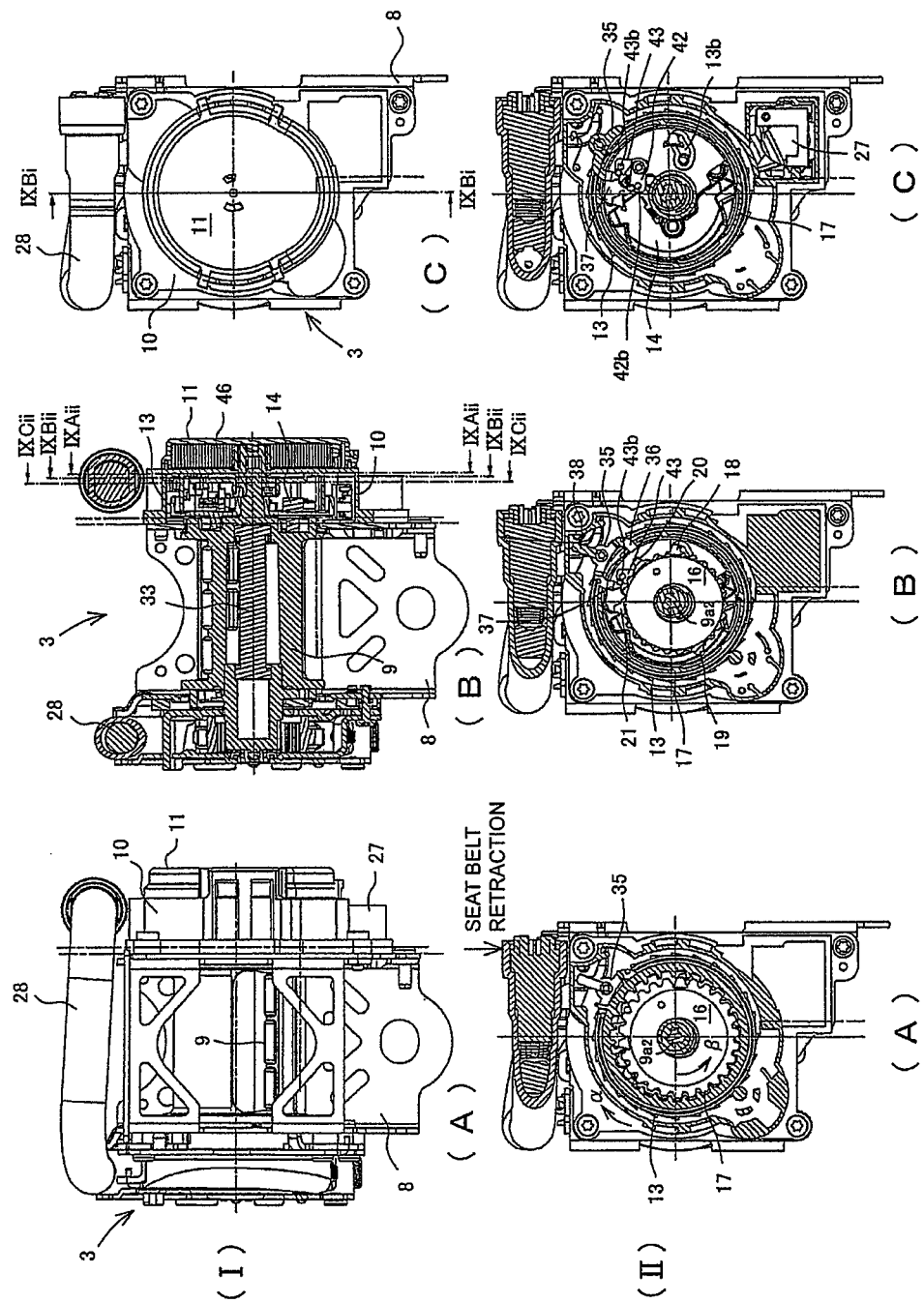
FIG. 9(I)(A) is a front view of the seatbelt retractor of this example, FIG. 9(I)(B) is a cross-sectional view taken along the line IXBi-IXBi of FIG. 9(I)(C), FIG. 9(I)(C) is a right side view of the seatbelt retractor of this example, FIG. 9(II)(A) to FIG. 9(II)(C) are a cross-sectional view taken along the line IXAii-IXAii in FIG. 9(I)(B), a cross-sectional view taken along the line IXBii-IXBii in FIG. 9(I)(B), and a cross-sectional view taken along the line IXCii-IXCii in FIG. 9(I)(B), respectively.

When the spool 9 rotates further in the clockwise α (the seatbelt retracting direction) and the entire amount or almost the entire amount of the seatbelt 4 is retracted, the eccentric gear 16 rotates further counterclockwise and the pressed pin 42b of the first rocking movement prevention lever 42 comes into contact with the control lever off flywheel control lever 37 of the control lever 35 as illustrated in FIG. 8(II)(B) and FIG. 8(II)(C). After the contact of the pressed pin 42b with the control lever off flywheel control lever 37, the eccentric gear 16 rotates further counterclockwise, so that the pressed pin 42b is pressed by the control lever off flywheel control lever 37. Accordingly, the first rocking movement prevention lever 42 and the second rocking movement prevention lever 43 start counterclockwise rotation integrally in FIG. 8(II)(B) and FIG. 8(II)(C). When the spool 9 rotates further in the seatbelt retracting direction β, the first rocking movement prevention lever 42 and the second rocking movement prevention lever 43 complete the rotation thereof and are set and held at the operating position as illustrated in FIG. 9(II)(B) and FIG. 9(II)(C). At this time, the seatbelt retractor 3 is switched from the ALR function to the ELR function by the operation of the ELR-ALR switching mechanism 24.

At the operating position of the first rocking movement prevention lever 42 and the second rocking movement preventing lever 43, the flywheel holding portion 42*c* of the first rocking movement prevention lever 42 takes a position opposing the held portion 14*d* of the flywheel 14 almost without a gap therebetween. When the entire amount of the seatbelt 4 is retracted, the rotation of the spool 9 in the seatbelt retracting direction is stopped. Accordingly, the flywheel 14 makes an attempt to rotate in the direction in which the locking claw 14*b* of the flywheel 14 engages the ratchet teeth 25 with its inertia force. However, the held portion 14*d* of the flywheel 14 comes into contact immediately with the flywheel holding portion 42*c* of the first rocking movement prevention lever 42. Accordingly, since the flywheel holding portion 42*c* holds the held portion 14*d* of the flywheel 14, the further rotation of the flywheel 14 in the same direction is prevented. Therefore, the operation of the flywheel 14 (that is, the operation of the webbing sensor) is cancelled, and end locking caused by the flywheel 14 is prevented.

Figure 10:
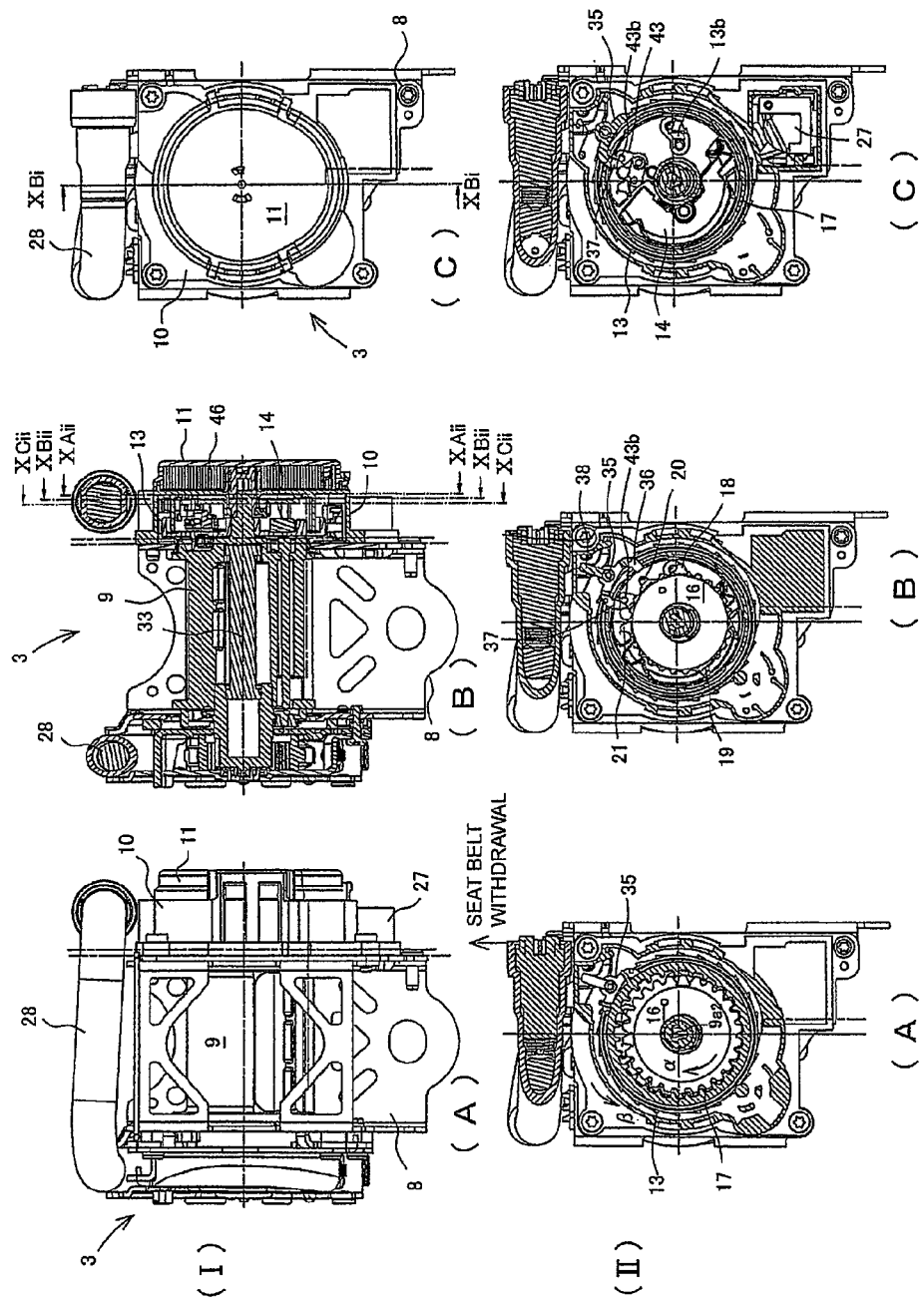
FIG. 10(I)(A) is a front view of the seatbelt retractor of this example, FIG. 10(I)(B) is a cross-sectional view taken along the line XBi-XBi of FIG. 10(I)(C), FIG. 10(I)(C) is a right side view of the seatbelt retractor of this example, FIG. 10(II)(A) to FIG. 10(II)(C) are a cross-sectional view taken along the line XAii-XAii in FIG. 10(I)(B), a cross-sectional view taken along the line XBii-XBii in FIG. 10(I)(B), and a cross-sectional view taken along the line XCii-XCii in FIG. 10(I)(B), respectively.
Figure 11:
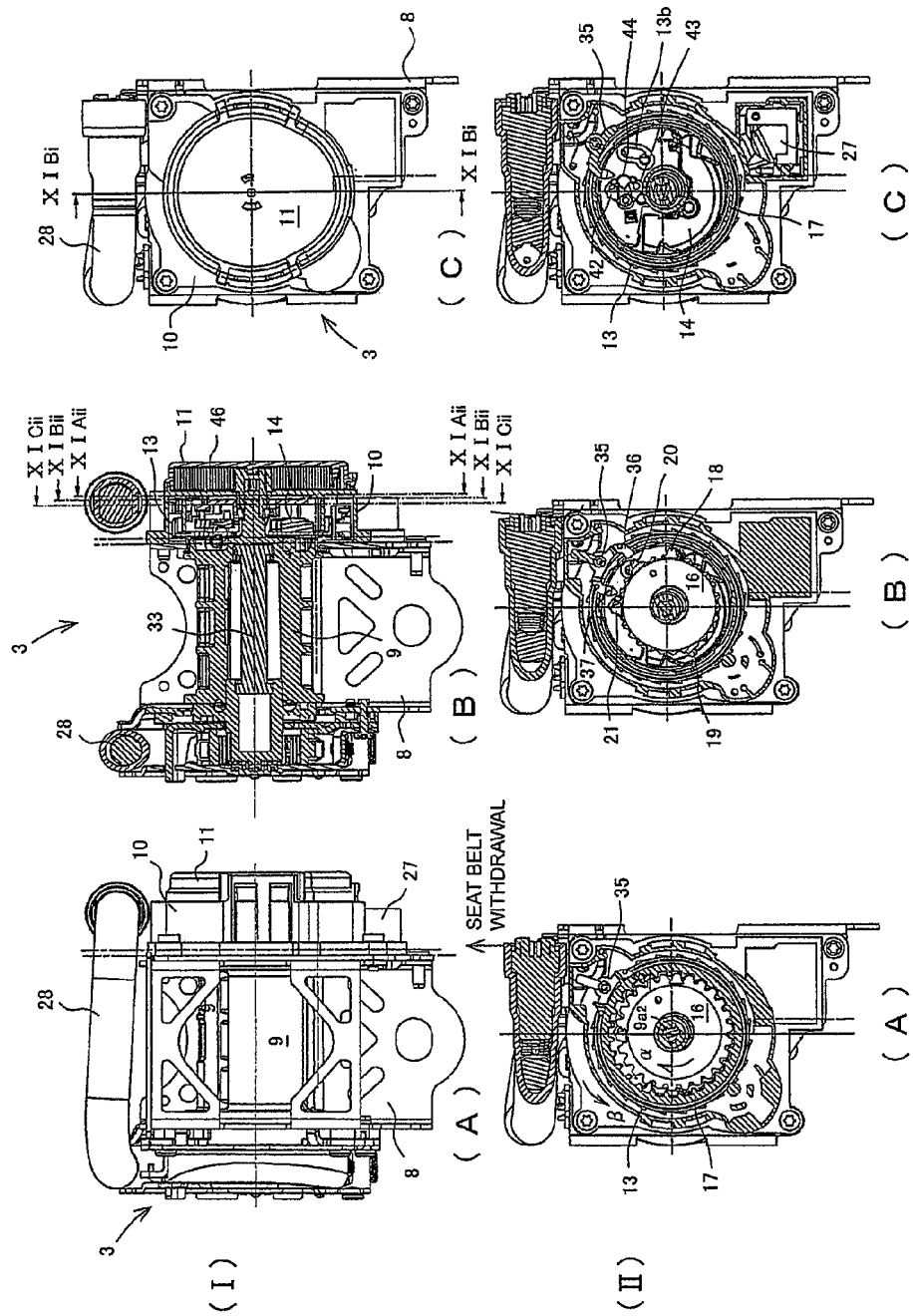
FIG. 11(I)(A) is a front view of the seatbelt retractor of this example, FIG. 11(I)(B) is a cross-sectional view taken along the line XIBi-XIBi of FIG. 11(I)(C), FIG. 11(I)(C) is a right side view of the seatbelt retractor of this example, FIG. 11(II) (A) to FIG. 11(II)(C) are a cross-sectional view taken along the line XIAii-XIAii in FIG. 11(I)(B), a cross-sectional view taken along the line XIBii-XIBii in FIG. 11(I)(B), and a cross-sectional view taken along the line XICii-XICii in FIG. 11(I)(B), respectively.

When the seatbelt 4 is withdrawn from the state in which the entire amount of the seatbelt 4 is retracted, the spool 9 rotates counterclockwise (the seatbelt withdrawal direction) in FIG. 9(II)(A) to FIG. 9(II)(C). Then, the lock gear 13, the flywheel 14, the first rocking movement prevention lever 42, and the second rocking movement prevention lever 43 rotate counterclockwise integrally with the spool 9 as illustrated in FIG. 9(II)(C). At the same time, the eccentric gear 16 rotates clockwise in the direction opposite to the direction of rotation of the spool 9 in FIG. 9(II)(A) and FIG. 9(II)(B). Then, the pressed pin 43*b* of the second rocking movement prevention lever 43 comes into contact with the control lever off flywheel control lever 37 of the control lever 35 as illustrated in FIG. 10(II)(B) and FIG. 10(II)(C). After the contact of the pressed pin 43*b* with the control lever off flywheel control lever 37, the lock gear 13, the first rocking movement prevention lever 42 and the second rocking movement prevention lever 43 rotate further counterclockwise, so that the pressed pin 43*b* is pressed by the control lever off flywheel control lever 37. Accordingly, the first rocking movement prevention lever 42 and the second rocking movement prevention lever 43 start clockwise rotation integrally in FIG. 10(II)(B) and FIG. 10(II)(C). When the spool 9 rotates further in the seatbelt withdrawal direction and a predetermined amount of more of the seatbelt 4 is withdrawn, the first rocking movement prevention lever 42 and the second rocking movement prevention lever 43 complete the rotation thereof and are set and held at the non-operating position as illustrated in FIG. 11(II)(B) and FIG. 11(II)(C).

At the non-operating position of the first rocking movement prevention lever 42 and the second rocking movement preventing lever 43, the flywheel holding portion 42*c* of the first rocking movement prevention lever 42 takes a position not opposing the held portion 14*d* of the flywheel 14. Therefore, the flywheel holding portion 42*c* is in a state in which the rocking movement of the flywheel 14 is not cancelled.

Figure 12:
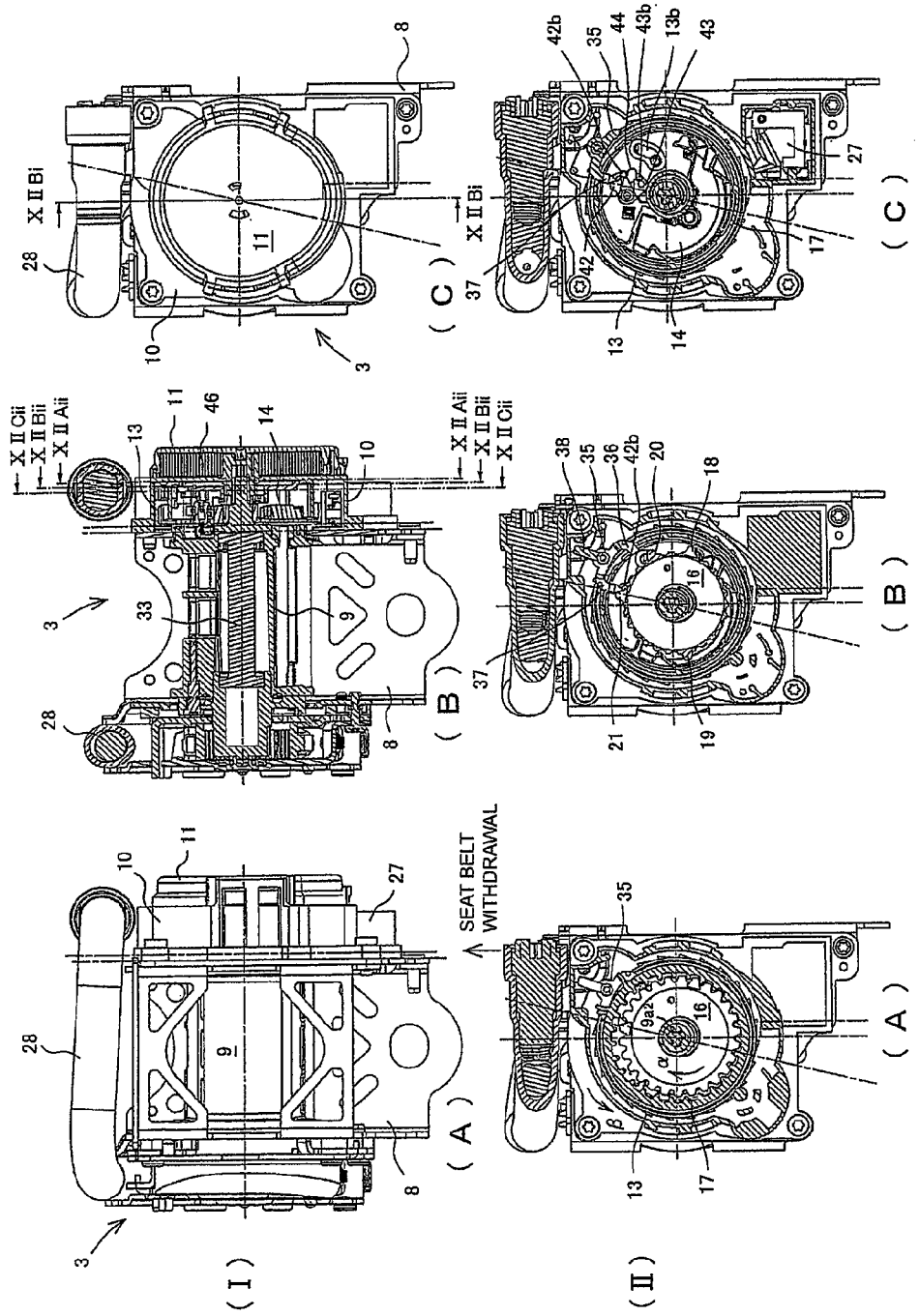
FIG. 12(I)(A) is a front view of the seatbelt retractor of this example, FIG. 12(I)(B) is a cross-sectional view taken along the line XIIBi-XIIBi of FIG. 12(I)(C), FIG. 12(I)(C) is a right side view of the seatbelt retractor of this example, FIG. 12(II) (A) to FIG. 12(II)(C) are a cross-sectional view taken along the line XIIAii-XIIAii in FIG. 12(I)(B), a cross-sectional view taken along the line XIIBii-XIIBii in FIG. 12(I)(B), and a cross-sectional view taken along the line XIICii-XIICii in FIG. 12(I) (B), respectively.

Furthermore, when the seatbelt 4 is withdrawn and the spool 9 rotates in the seatbelt withdrawal direction, the lock gear 13, the first rocking movement prevention lever 42, and the second rocking movement prevention lever 43 rotate further counterclockwise. Then, the pressed pin 42*b* of the first rocking movement prevention lever 42 comes into contact with the control lever off flywheel control lever 37. Subsequently, the lock gear 13, the first rocking movement prevention lever 42 and the second rocking movement prevention lever 43 rotate further counterclockwise, so that the pressed pin 42*b* is pressed by the control lever off flywheel control lever 37. Accordingly, only the first rocking movement prevention lever 42 rotates clockwise in FIG. 12(II)(B) and FIG. 12(II)(C) while compressing the first lever spring 44. At this time, since the second rocking movement prevention lever 43 does not rotate, the first rocking movement prevention lever 42 and the second rocking movement prevention lever 43 bent at an acute angle as illustrated in FIG. 12(II)(B) and FIG. 12(II)(C). Accordingly, the pressed pin 42*b* allows passage of the control lever off flywheel control lever 37 and the lock gear 13, the first rocking movement prevention lever 42, and the second rocking movement prevention lever 43 rotate further counterclockwise. In other words, the stack of the stack (that is, the spool 9) of the lock gear 13 is avoided.

Figure 13:
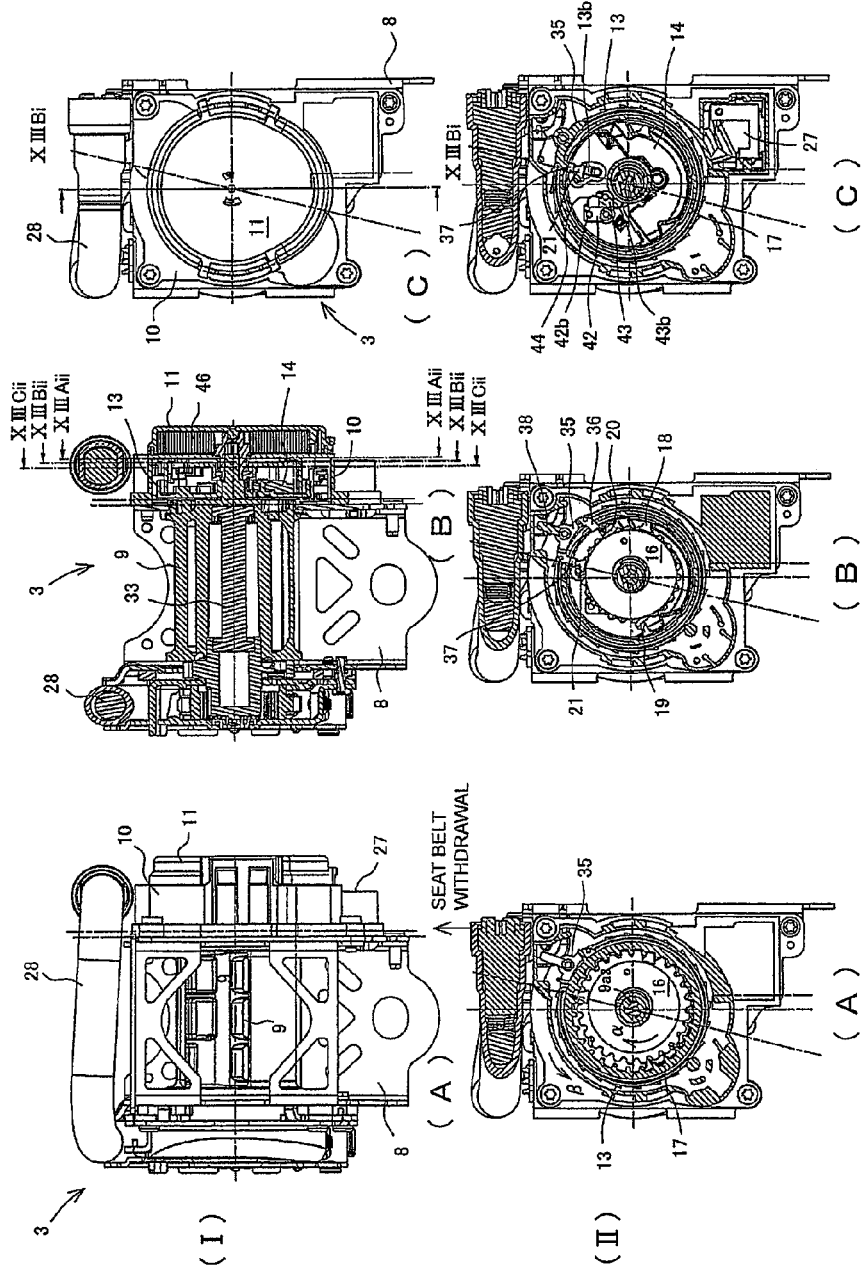
FIG. 13(I)(A) is a front view of the seatbelt retractor of this example, FIG. 13(I)(B) is a cross-sectional view taken along the line XIIIBi-XIIIBi of FIG. 13(I)(C), FIG. 13(I)(C) is a right side view of the seatbelt retractor of this example, FIG. 13(II)(A) to FIG. 13(II)(C) are a cross-sectional view taken along the line XIIIAii-XIIIAii in FIG. 13(I)(B), a cross-sectional view taken along the line XIIIBii-XIIIBii in FIG. 13(I) (B), and a cross-sectional view taken along the line XIIICii-XIIICii in FIG. 13(I) (B), respectively.

Furthermore, when the spool 9 rotates in the seatbelt withdrawal direction, the lock gear 13, the first rocking movement prevention lever 42, and the second rocking movement prevention lever 43 rotate further counterclockwise. Then, the fourth lever operating cam 21 comes into contact with the control lever off flywheel control lever 37 and pushes the control lever off flywheel control lever 37 as illustrated in FIG. 13(II)(B) upward. Accordingly, the control lever 35 starts clockwise rotation in FIG. 13(II)(B) about the axis of rotation 39. Then, when the spool 9 rotates further in the seatbelt withdrawal direction, the control lever 35 completes the rotation thereof as illustrated in FIG. 14(II)(B), and is set and held at the initial non-operating position. In this manner, end locking caused by the flywheel 14 is prevented by the eccentric gear 16 configured to control the ELR-ALR switching mechanism 24, and the control lever on lever 36 and the control lever off flywheel control lever 37 provided on the lock gear 13. In other words, the operation of the seatbelt withdrawal sensor is cancelled.

According to the seatbelt retractor 3 of this example, the control lever 35 that controls the rotations of the first rocking movement prevention lever 42 and the second rocking movement prevention lever 43 as the locking movement prevention member is controlled by the third lever operating cam 20 and the fourth lever operating cam 21 of the eccentric gear 16. Accordingly, even though the helical cam groove of the seatbelt retractor described in Patent Literatures 1 and 2 is not used, the first rocking movement prevention lever 42 and the second rocking movement prevention lever 43 may be set to the operating positions that prevent the rocking movement of the flywheel 14. Therefore, even when the amount of rotation of the first rocking movement prevention lever 42 and the second rocking movement prevention lever 43 between the non-operating position and the operating position is small while the amount of rotation of the spool 9 is relatively large, the seatbelt retractor may be formed to be small and compact.

In particular, the seatbelt retractor 3 of this example is a retractor having the ELR function and the ALR function, the control lever 35 that controls the rotation of the first rocking movement prevention lever 42 and the second rocking movement prevention lever 43 is controlled by the eccentric gear 16 of the ELR-ALR switching mechanism 24. In other words, the eccentric gear 16 configured to control the control lever 35 and the eccentric gear 16 of the ELR-ALR switching mechanism 24 are composed of one retractor. Accordingly, the number of components may be reduced, and simplification of the structures of the ELR-ALR switching mechanism 24 and end locking preventing mechanism 34 of the flywheel 14 is enabled. Consequently, the seatbelt retractor 3 may be formed to be small and compact effectively.

Since the flywheel 14 is not provided with a ring portion as in the seatbelt retractor described in Patent Literature 3 described above and other member for prevention the rocking movement of the flywheel 14, the positions of the centers of gravity of the flywheels can be made constant efficiently. Therefore, influence of the center of gravity of the flywheel 14 on the operation of the flywheel 14 may effectively be suppressed.

In this manner, according to the seatbelt retractor 3 of this example, prevention of end locking caused by the flywheel 14 may be performed further effectively, and the structure for preventing end locking may be formed to be small and compact. In addition, influence of the position of the center of gravity of the flywheel 14 on the operation of the flywheel 14 may be suppressed effectively.

Furthermore, when the lock gear 13 rotates in the seatbelt withdrawal direction by the withdrawal of the seatbelt 4 and hence the first rocking movement prevention lever 42 interferes with (abuts against) the control lever off flywheel control lever 37 of the control lever 35 in a state in which the control lever 35 is set to the operating position and the first rocking movement prevention lever 42 and the second rocking movement prevention lever 43 are set to the non-operating position, the first rocking movement prevention lever 42 is bent with respect to the second rocking movement prevention lever 43. Accordingly, even though the first rocking movement prevention lever 42 interferes with the control lever off flywheel control lever 37, the lock gear 13 can be rotated further in the seatbelt withdrawal direction. Therefore, the amount of rotation of the spool 9 (that is, the amount of withdrawal of the seatbelt 4) can further be increased, and the first rocking movement prevention lever 42 and the second rocking movement prevention lever 43 may be set to the non-operating positions in earlier stages when the seatbelt 4 is withdrawn in the state in which the entire amount of the seatbelt 4 is retracted and the operating positions of the first rocking movement prevention lever 42 and the second rocking movement prevention lever 43 are set.

In contrast, according to the seatbelt apparatus 1 provided with the seatbelt retractor 3 of this example, since end locking caused by the flywheel 14 can be prevented further effectively, the operability of the seatbelt 4 is improved and the action of fastening the seatbelt 4 by the occupant can be performed smoothly and stably.

Also, since the seatbelt retractor 3 may be formed to be small and compact, flexibility of layout of the respective components of the seatbelt apparatus 1 may be increased.

The present invention is not limited to the seatbelt retractor having both of the ELR function and the ALR function of the example described above, and the present invention may be applied to the seatbelt retractor having only the ELR function. Furthermore, the example described above is only an example of the embodiments of the seatbelt retractor of the present invention, and the respective components of the seatbelt retractor may be modified variously within a range of the matters described in Claims.

Industrial Applicability

The seatbelt retractor and the seatbelt apparatus of the present invention may be adequately used in the seatbelt retractor which has a probability of occurrence of end locking caused by the seatbelt withdrawn sensor (webbing sensor) and the seatbelt apparatus having the same and configured to constrain the occupant by the seatbelt withdrawn from the seatbelt retractor.

The invention claimed is:

1. A seatbelt retractor comprising: a spool configured to retract a seatbelt; a locking mechanism configured to allow the rotation of the spool at the time of non-operation and prevent the rotation of the spool in a seatbelt withdrawal direction at the time of operation; a seatbelt withdrawal sensor provided in a case and configured to be operated when the seatbelt is abruptly withdrawn at least at a predetermined speed higher than that under the normal conditions at the time at which the withdrawal of the seatbelt starts; and a lock operating mechanism configured to actuate the locking mechanism upon the operation of the seatbelt withdrawal sensor, wherein the lock operating mechanism at least includes a lock gear provided so as to be capable of rotating integrally with the spool at the time of non-operation and rotating relative to the spool at the time of operation, and configured to actuate the locking mechanism by the rotation relative to the spool at the time of operation, the seatbelt withdrawal sensor is provided on the lock gear so as to be capable of rocking between a non-operating position where the rotation of the lock gear is allowed in both of a seatbelt retracting direction and the seatbelt withdrawal direction and an operating position where the rotation of the lock gear is prevented at least in the seatbelt withdrawal direction, a rocking movement prevention member is provided on the lock gear, the rocking movement prevention member is configured to prevent the rocking movement of the seatbelt withdrawal sensor so as to be rotatable between the operating position where the seatbelt withdrawal sensor is held at the non-operating position to prevent the rocking movement toward the operating position at least at the time at which the entire amount or almost the entire amount of the seatbelt is being retracted and the non-operating position configured to make the rocking movement of the seatbelt withdrawal sensor free at the time at which the seatbelt is being withdrawn by a predetermined amount or more from the state in which the seatbelt is entirely retracted, a rocking movement prevention control mechanism configured to control the rotation of the rocking movement prevention member is provided, and the rocking movement prevention control mechanism includes a rocking movement prevention control member provided in the case so as to be rotatable between the non-operating position where the rocking movement prevention member is not controlled and the operating position where the rocking movement prevention member is controlled, and a rotation control member provided on the spool so as to rotate relative to the spool and having a rocking movement prevention control member controller configured to perform a deceleration rotation at a rotating speed lower than the rotating speed of the spool at the time of rotation of the spool and control the rotation of the rocking movement prevention control member at an outer peripheral edge, wherein the rocking movement prevention control member is a control lever including an operating position setting lever provided between the non-operating position and the operating position so as to be rotatable and configured to set to the operating position and a non-operating position setting lever configured to set to the non-operating position, the rocking movement prevention control member controller of the rotation control member includes a first control lever controller coming into contact with the operating position setting lever and pressing the operating position setting lever to set the control lever to the operating position and a second control lever controller coming into contact with the non-operating position setting lever and pressing the non-operating position setting lever to set the control lever to the non-operating position, wherein the non-operating position setting lever is a lever configured to rotate and control the rocking movement prevention member between the non-operating position and the operating position, wherein the rocking movement prevention member includes a first rocking movement prevention lever and a second rocking movement prevention lever coupled to the first rocking movement prevention lever at a predetermined angle, and the first rocking movement prevention lever comes into contact with the non-operating position setting lever at the time of retraction of the seatbelt by the spool so as to set the rocking movement prevention member to the operating position, and the second rocking movement prevention lever comes into contact with the non-operating position setting lever at the time of withdrawal of the seatbelt so as to set the rocking movement prevention member to the non-operating position, wherein the first rocking movement prevention lever and the second rocking movement prevention lever are coupled so as to be capable of rotating relative to each other, the first rocking movement prevention lever and the second rocking movement prevention lever are set and held at the predetermined angle under the normal conditions, and the seatbelt is withdrawn in a state in which the control lever is set to the operating position and the rocking movement prevention member is set to the non-operating position, so that when the first rocking movement prevention lever comes into contact with the non-operating position setting lever, the first rocking movement prevention lever rotates relative to the second rocking movement prevention lever in a direction of being bent toward the second rocking movement prevention lever.

2. The seatbelt retractor according to claim 1, wherein the rotation control member is an eccentric rotation control member configured to rotate eccentrically about an axis of rotation of the spool at the time of rotation of the spool.

3. The seatbelt retractor according to claim 2, comprising an emergency lock-automatic lock switching mechanism configured to selectively switch between an emergency lock state and an automatic lock state, wherein the emergency lock-automatic lock switching mechanism includes a locked state switching eccentric rotation control member configured to rotate eccentrically with respect to an axis of rotation of the spool at the time of rotation of the spool so as to switch between the emergency lock state and the automatic lock state, and the eccentric rotation control member is used also as the locked state switching eccentric rotation control member.

4. A seatbelt apparatus comprising:

a seatbelt configured to constrain an occupant;

a seatbelt retractor according to claim 1 configured to withdrawably retract the seatbelt and configured to actuate in the case of an emergency and prevent the withdrawal of the seatbelt;

a tongue slidably supported by the seatbelt withdrawn from the seatbelt retractor; and a buckle that is provided on a vehicle body or a vehicle seat and that allows disengageable engagement of the tongue.

* * * * *